(12) United States Patent
Kozuka et al.

(10) Patent No.: US 10,462,407 B2
(45) Date of Patent: Oct. 29, 2019

(54) DISPLAY METHOD AND DISPLAY DEVICE

(71) Applicant: Panasonic Intellectual Property Corporation of America, Torrance, CA (US)

(72) Inventors: Masayuki Kozuka, Osaka (JP); Takashi Higashida, Hyogo (JP); Yoshihiro Mori, Osaka (JP); Haruyasu Hirakawa, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/728,550

(22) Filed: Oct. 10, 2017

(65) Prior Publication Data

US 2018/0048845 A1 Feb. 15, 2018

Related U.S. Application Data

(63) Continuation of application No. PCT/JP2016/000626, filed on Feb. 8, 2016.

(Continued)

(30) Foreign Application Priority Data

Dec. 18, 2015 (JP) ................... 2015-248025

(51) Int. Cl.
*H04N 5/57* (2006.01)
*H04N 11/24* (2006.01)
(Continued)

(52) U.S. Cl.
CPC ............ *H04N 5/57* (2013.01); *H04N 5/20* (2013.01); *H04N 9/646* (2013.01); *H04N 11/24* (2019.01);
(Continued)

(58) Field of Classification Search
CPC ........................................................ H04N 5/57
(Continued)

(56) References Cited

U.S. PATENT DOCUMENTS

| 2014/0225941 A1* | 8/2014 | Van der Vleuten ... G09G 5/006 345/690 |
| 2016/0173811 A1* | 6/2016 | Oh ........................ H04N 19/70 725/116 |

FOREIGN PATENT DOCUMENTS

| JP | 2008-167418 | 7/2008 |
| JP | 2014-532195 | 12/2014 |
| WO | 2015/034188 | 3/2015 |

OTHER PUBLICATIONS

International Search Report of PCT application No. PCT/JP2016/000626 dated May 10, 2016.

(Continued)

*Primary Examiner* — Jefferey F Harold
*Assistant Examiner* — Justin B Sanders
(74) *Attorney, Agent, or Firm* — Wenderoth, Lind & Ponack, L.L.P.

(57) ABSTRACT

Provided is a display method of displaying, on a display device, video of video data where luminance of video is defined by a first EOTF corresponding to HDR. The method includes: acquiring the video data; performing first conversion where the luminance of the video is converted to a luminance corresponding to a dynamic range of a third EOTF, where, with regard to a second EOTF that is part of the first EOTF and is the part of a luminance range where the peak luminance indicated by the peak luminance information included in the acquired video data is maximum luminance, the dynamic range of luminance of the second EOTF is reduced with maximum luminance of the second EOTF matching displayable luminance of the display device, while maintaining the relative relationship of luminance of the (Continued)

second EOTF; and displaying the video on the display device using the result of the first conversion.

10 Claims, 18 Drawing Sheets

Related U.S. Application Data

(60) Provisional application No. 62/160,016, filed on May 12, 2015.

(51) Int. Cl.
*H04N 5/20* (2006.01)
*H04N 9/64* (2006.01)
*H04N 21/431* (2011.01)
*H04N 21/435* (2011.01)

(52) U.S. Cl.
CPC ......... *H04N 21/431* (2013.01); *H04N 21/435* (2013.01)

(58) Field of Classification Search
USPC .......................................... 348/453
See application file for complete search history.

(56) References Cited

OTHER PUBLICATIONS

Extended European Search Report dated Feb. 12, 2018 in European Application No. 16792319.2.

\* cited by examiner

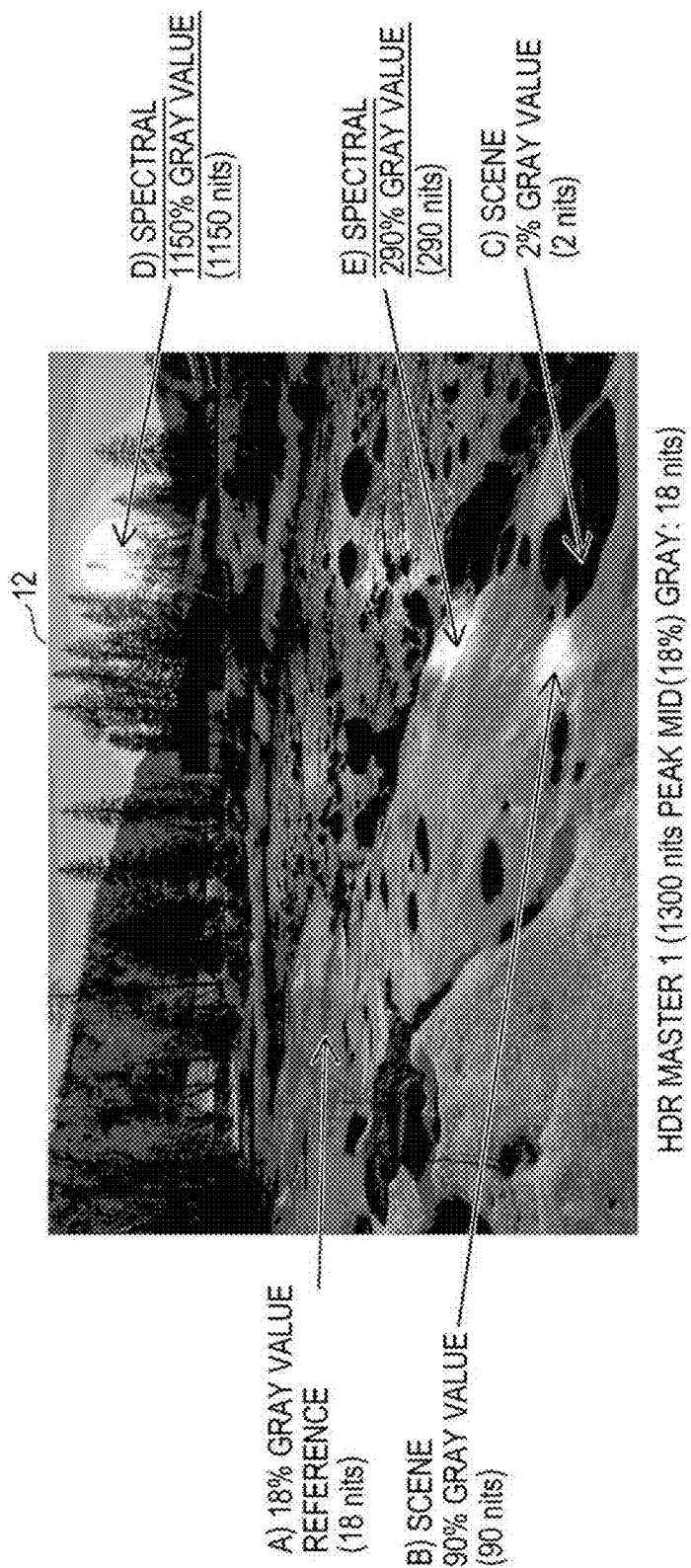

DISPLAY METHOD AND DISPLAY DEVICE

BACKGROUND

1. Technical Field

The present invention relates to a display method and a display device.

2. Description of the Related Art

There conventionally has been disclosed an image signal processing device to improve the luminance level that can be displayed (e.g., Japanese Unexamined Patent Application Publication No. 2008-167418).

However, the above Japanese Unexamined Patent Application Publication No. 2008-167418 has needed further improvement.

SUMMARY

In one general aspect, the techniques disclosed here feature a display method of displaying, on a display device, video of video data including peak luminance information indicating peak luminance of the video, where luminance of video is defined by a first electro-optical transfer function (EOTF) indicating a correlation of high dynamic range (HDR) luminance and code values. The method includes: acquiring the video data; performing first conversion where the luminance of the video is converted to a luminance corresponding to a dynamic range of a third EOTF, where, with regard to a second EOTF that is part of the first EOTF and is the part of a luminance range where the peak luminance indicated by the peak luminance information included in the acquired video data is the maximum luminance, the dynamic range of luminance of the second EOTF is reduced with the maximum luminance of the second EOTF matching the displayable luminance of the display device, while maintaining the relative relationship of luminance of the second EOTF; and displaying the video on the display device using the result of the first conversion.

General or specific embodiments may be implemented as a device, a system, an integrated circuit, a computer program, or a computer-readable recording medium such as a Compact Disc Read-Only Memory (CD-ROM) or the like, and may also be implemented as any selective combination of a device, a system, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10A is a diagram illustrating an example of luminance as a result of having mastered the original image illustrated in FIG. 7 to an HDR image;

DETAILED DESCRIPTION

Underlying Knowledge Forming Basis of the Present Disclosure

The present inventor has found that the following problems occur with regard to the image signal processing device described in the Background Art section. The image signal processing device disclosed in Japanese Unexamined Patent Application Publication No. 2008-167418 calculates linear luminance for each pixel based on linear RGB values calculated from a pixel making up a subject, based on the linear RGB values and linear luminance calculates a corrected linear value of each pixel based on the linear RGB value and linear luminance, and a corrected linear RGB value of a composited pixel of multiple pixels including the pixel, and performs gamma correction of the corrected linear luminance and corrected linear RGB values to calculate a display luminance and display RGB values. Thus, the number of expressible gradients is increased in the image signal processing device by correcting the linear luminance based on the corrected linear RGB values.

In recent years, as a result of advance in video technology, there is known a technology of displaying HDR video, where luminance has been defined in HDR that is a broader dynamic range than the dynamic range in which convention video has defined luminance, on a display device such as a TV. Change in video technology will be described with reference to FIG. 1.

Figure 1:
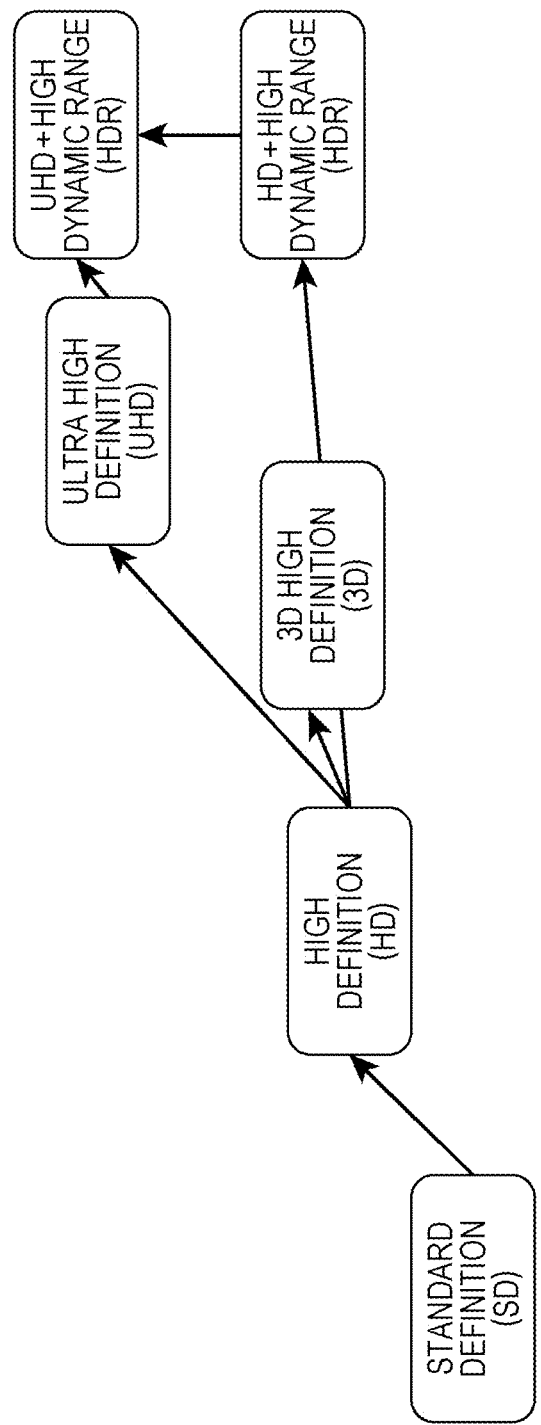
FIG. 1 is a diagram for describing advance in video technology.

FIG. 1 is a diagram for describing evolution of video technology. Heretofore, primary focus in increasing image quality of video has primarily focused on more display pixels, and Standard Definition (SD) video that has 720×480 pixels through High Definition (HD) so-called 2K video that has 1920×1080 pixels are in widespread use.

As of recent, introduction has started of Ultra High Definition (UHD) video that has 3840×1920 pixels, and so-called 4K video that has 4096×1920, for even higher image quality. Raising image equality of video by expanding the dynamic range and broadening the color gamut, or addition, improvement, etc., of frame rates, in addition to high resolution of video by the introduction of 4K, is being studied.

With regard to expanding the dynamic range, improved performance of digital cameras and complementary metal-oxide-semiconductor (CMOS) image sensors now enables shooting of images with a broad dynamic range of 14 stops or more, for the number of stops representing exposure. Accordingly, shooting can be performed of light that is 100% reflected light or brighter (bright light such as mirror reflection light or the like), while maintaining gradients at dark portions. HDR is being noted as a signal standard that enables transmission of signals with even higher luminance, in order to exploit the improved performance of such cameras and image sensors for improvement in expression.

TV signals heretofore have been referred to as SDR and have a peak luminance (maximum luminance) of 100 nits, while in the case of HDR (particularly HDR encoded by ST 2084 (PQ curve) that is an EOTF standardized by the Society of Motion Picture and Television Engineers (SMPTE), peak luminance of 10,000 nits or higher can now be expressed. Specific applications of HDR are assumed to be broadcasting, packaged media (Blu-ray (a registered trademark) disc, etc.), Internet distribution, and so forth, in the same way as with HD and UHD.

Figure 2:
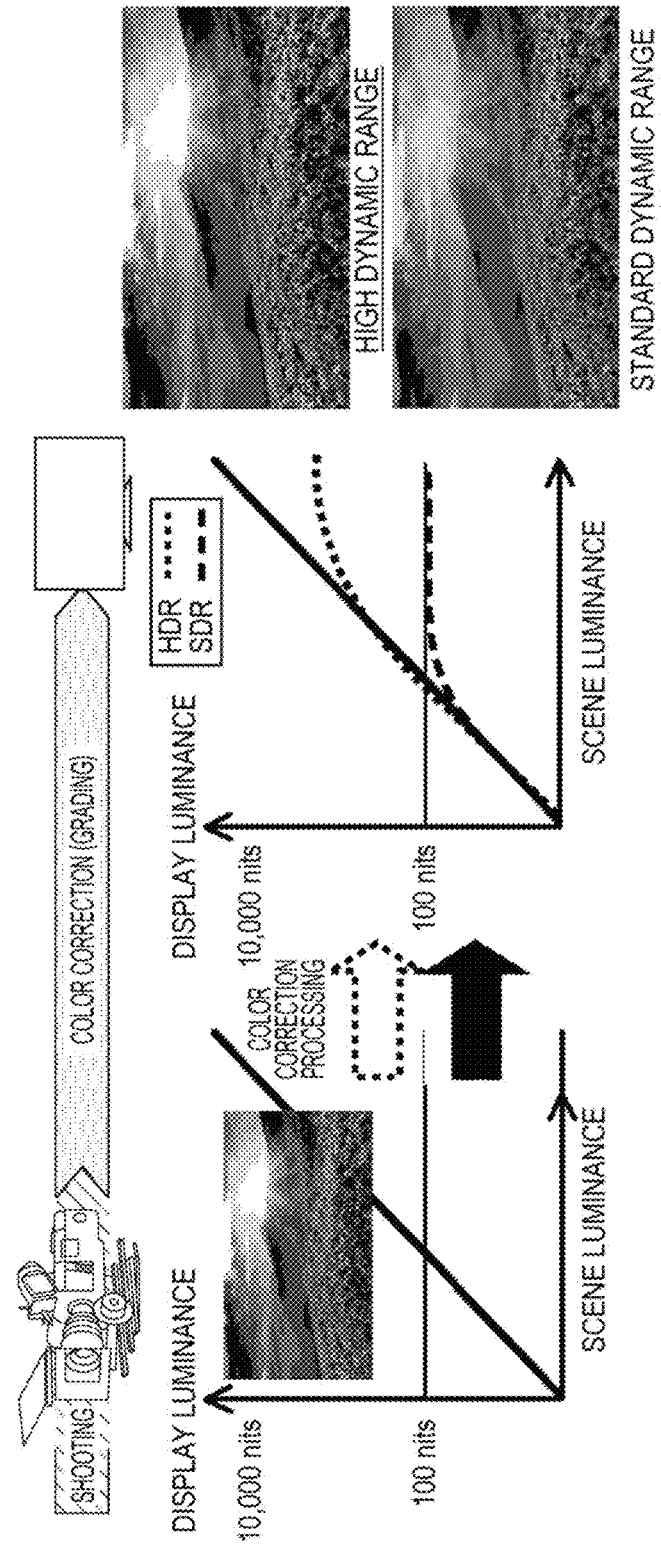
FIG. 2 is a diagram for describing the difference between standard dynamic range (SDR) signals and HDR signals.

Next, SDR and HDR will be described with reference to FIG. 2. FIG. 2 is a diagram for describing the difference between SDR signals and HDR signals. Note that SDR signals are video signals indicating SDR video corresponding to SDR, and HDR signals are video signals indicating HDR video corresponding to HDR.

Original signals obtained by shooting with a digital camera having a broad dynamic range (14 stops, etc.) contain luminance information over the broad range of 0 to 10,000 nits. SDR signals are video satisfying a broadcast standard such as bt709 or the like, and are video signals obtained by color correction processing (grading) to yield SDR video with a peak luminance of 100 nits from original signals. That is to say, SDR signals are video signals where the luminance of the video is defined by a dynamic range of 0 to 100 nits in luminance.

On the other hand, HDR signals are video signals obtained by color correction processing (grading) to yield HDR video with a maximum luminance up to 10,000 nits for the dynamic range of luminance, to match the restrictions of ST 2084 (hereinafter referred to as "PQ curve"), where the restrictions of peak luminance of 100 nits such as in SDR signals have been eliminated. That is to say, HDR signals are video signals where the luminance of the video is defined by a dynamic range of 0 to 10000 nits in luminance. Note that the maximum luminance of the dynamic range of luminance for HDR signals is not restricted to 10,000 nits, and may be 800 to 4000 nits, for example.

Thus, the dynamic range of luminance in HDR is a dynamic range that has a greater peak luminance than the dynamic range of luminance in SDR. Note that the minim luminance of the dynamic range of luminance in HDR is the same as the minimum luminance of the dynamic range of luminance in SDR, which is 0 nits.

Figure 3:
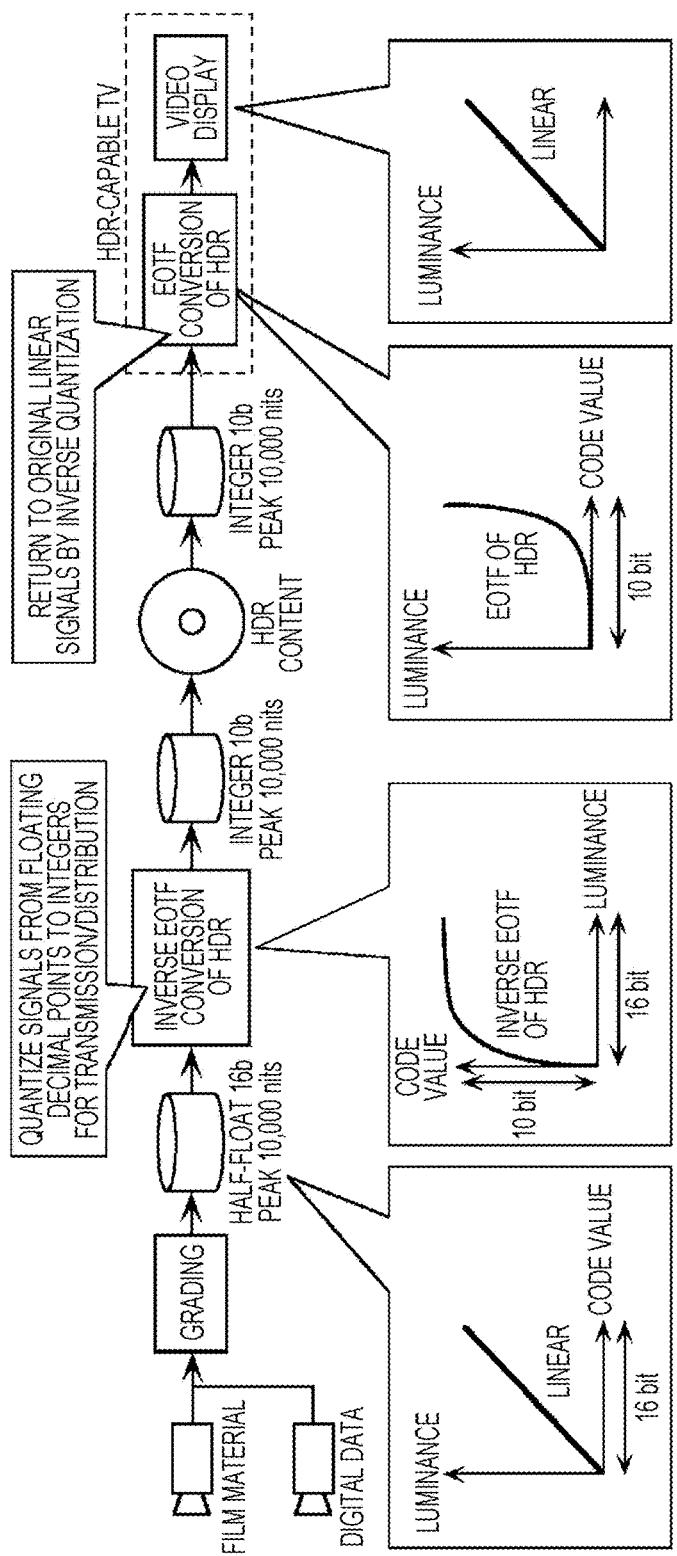
FIG. 3 is an explanatory diagram of a method for deciding code values for luminance signals stored in contents, and a process of restoring luminance from code values at the time of playback.

FIG. 3 is an explanatory diagram of a method for deciding code values for luminance signals stored in contents, and a process of restoring luminance from code values at the time of playback. The video signals in this example are HDR signals corresponding to HDR. Following grading, an image is quantized by inverse EOTF conversion of HDR, and code values corresponding to the luminance of the image are decided. Image encoding and so forth is performed based on the code values, and a video stream is generated. At the time of playback, the decoded results of the stream are converted into linear signals by performing inverse quantization based on EOTF of HDR, thereby restoring the luminance for each pixel. Hereinafter, quantization using inverse EOTF of HDR will be referred to as "HDR inverse EOTF conversion". Inverse quantization using EOTF of HDR will be referred to as "HDR EOTF conversion". In the same way, quantization using inverse EOTF of SDR will be referred to as "SDR inverse EOTF conversion". Inverse quantization using EOTF of SDR will be referred to as "SDR EOTF conversion".

In a case of performing display control where HDR signals are displayed using an HDR-capable display device (e.g., an HDR TV) as described above, the displayable peak luminance (hereinafter referred to as "display peak luminance") of the HDR TV is often lower than the peak luminance of the HDR signals. Accordingly, there is a need for the dynamic range of the luminance of the HDR signals to be compressed to the dynamic range of the luminance which the HDR TV can handle, so that the peak luminance of the HDR signals match the display peak luminance of the HDR TV.

However, the luminance correction (conversion) such as that performed by the image signal processing device disclosed in Japanese Unexamined Patent Application Publication No. 2008-167418 did not take into consideration a conversion method for luminance when correcting (converting) luminance to a dynamic range of luminance narrower than the dynamic range of luminance in HDR where video luminance is defined. This has led to the following problem.

Due to the difference between EOTF for SDR (gamma curve: relative luminance reference) and EOTF for HDR (ST 2084: PQ curve: absolute luminance reference), there has been the following problem when displaying HDR signals on an HDR TV, unlike the case of displaying SDR signals on an SDR-capable display device (e.g., an SDR TV). Human eyes do not recognize luminance of video by absolute luminance but recognize by relative luminance. SDR video is video of a relative luminance reference, which has been graded to SDR video of which the peak luminance is 100 nits, by the luminance of original signals being quantized by EOTF of SDR (gamma curve).

Figure 4:
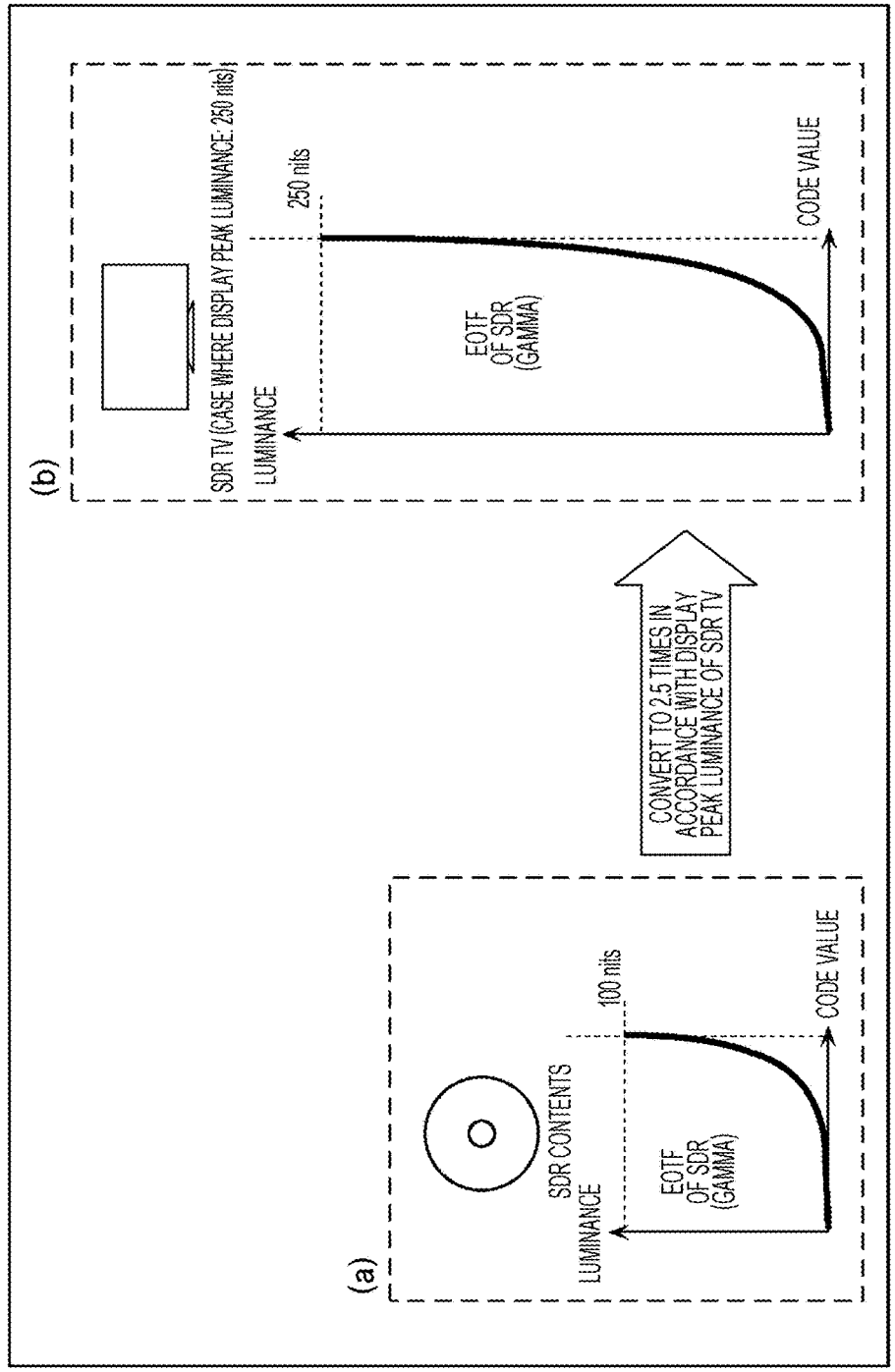
FIG. 4 is a diagram for describing an example of display processing, in a case of displaying SDR signals on an SDR TV.

FIG. 4 is a diagram for describing an example of display processing in a case of displaying SDR signals on an SDR TV. The (a) in FIG. 4 is a diagram illustrating EOTF of SDR where luminance of SDR content video is defined. The (b) in FIG. 4 is a diagram illustrating EOTF of SDR converted in accordance with display peak luminance of an SDR TV.

As illustrated in FIG. 4, when the display peak luminance of SDR TV differs from 100 nits (in this example, 250 nits which is larger than 100 nits) adjustment and display is performed while maintaining the relative relation in contrast, in accordance with the luminance display capabilities of the SDR TV. Specifically, the EOTF of SDR is adjusted while maintaining the relative relation in contrast by multiplying variables representing the luminance of EOTF of SDR by 2.5 so as to match the display peak luminance of the SDR TV, thereby generating an EOTF matching the luminance display capabilities of the SDR TV, and displaying SDR video on the SDR TV using this EOTF. Accordingly, display is realized in a form close to the intent of the content creator even if the luminance display capabilities of the SDR TV differ from the luminance dynamic range of the SDR contents.

Accordingly, in a case where in a case of displaying SDR video represented by SDR signals on an SDR TV, the SDR TV displays the SDR video represented by SDR signals according to a relative luminance reference. On the other hand, in a case of displaying HDR video represented by HDR signals on an HDR TV, it is required that the HDR TV faithfully display the HDR video by the absolute luminance reference for the PQ curve, since the PQ curve has been contrived taking into consideration human vision characteristics (the entire luminance range that humans are capable of recognizing).

International standardization organizations for audio visual (AV) technology, such as the Blu-ray (a registered trademark) Disc Association, UHD Alliance, and so forth, are requiring that HDR-capable contents be graded with a predetermined luminance smaller than 10,000 nits (e.g., 1000 nits) as the upper limit, for the time being (luminances above this also permissible).

Figure 5:
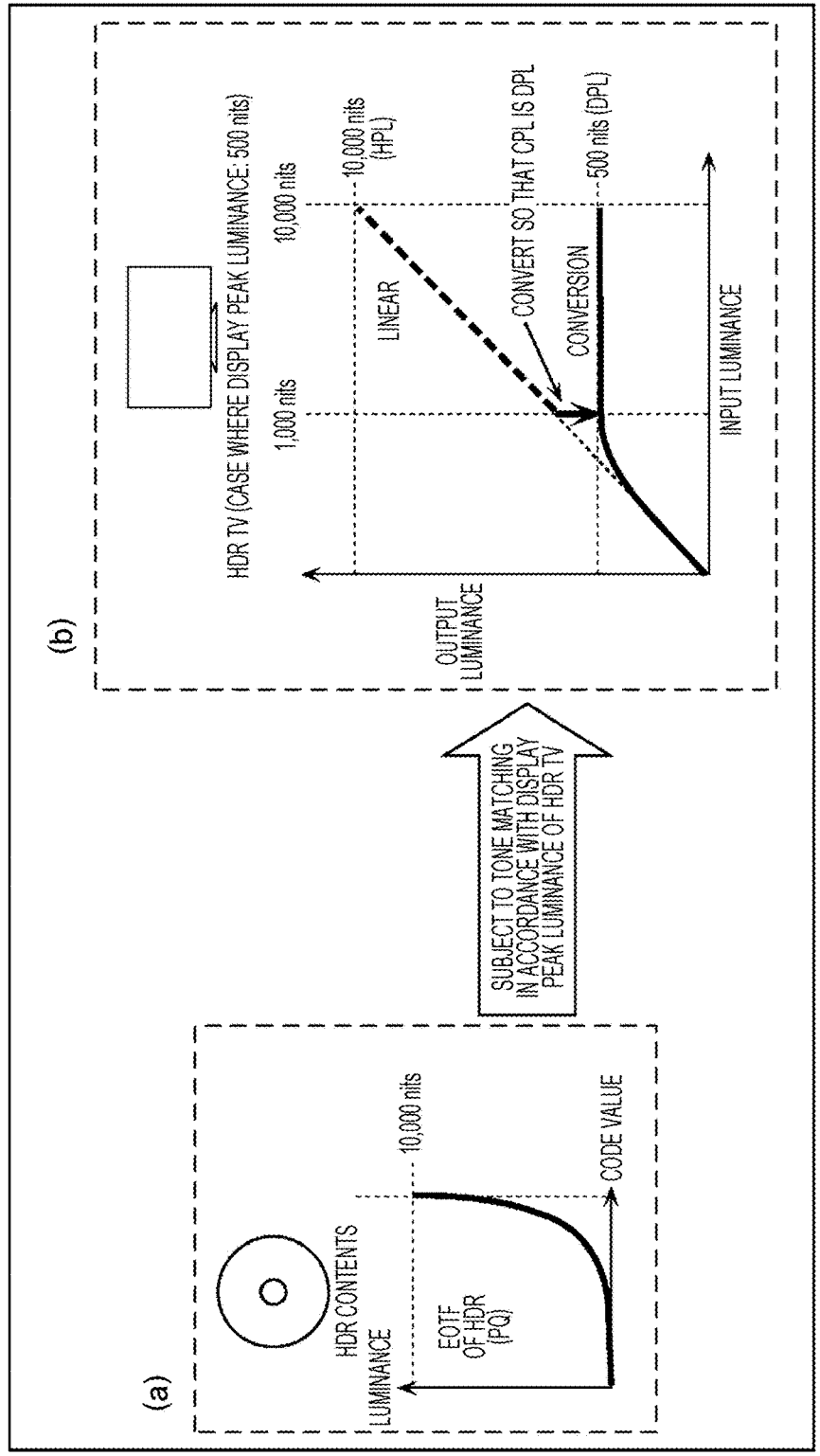
FIG. 5 is a diagram for describing an example of display processing, in a case of displaying HDR signals on an HDR TV.

FIG. 5 is a diagram for describing an example of display processing in a case of displaying HDR signals on an HDR TV. The (a) in FIG. 5 is a diagram illustrating EOTF of HDR where the luminance of video of HDR contents is defined. The (b) in FIG. 5 is a diagram illustrating tone mapping processing (luminance conversion processing) for converting luminance of HDR contents in accordance with display peak luminance of an HDR TV.

In a case of displaying HDR video defined by a dynamic range having a predetermined luminance as the peak luminance, on an HDR TV of which the display peak luminance is smaller than the predetermined luminance (e.g., 500 nits), the HDR TV is required to express the predetermined luminance that is the peak luminance of the HDR video, by predetermined tone mapping processing being performed on the HDR signals of the HDR video, as illustrated in FIG. 5. That is to say, performing tone mapping processing to match the predetermined luminance to the display peak luminance of the HDR TV is required, so that the peak luminance of the HDR video can be expressed on the HDR TV.

In this case, if the luminance component is all that matters, the luminance of the video can be converted to match the display peak luminance of the HDR TV by performing tone mapping processing including knee curve processing using a knee curve that shows the relationship between input luminance and output luminance, as illustrated in (b) in FIG. 5. However, in a case of applying equivalent knee curve processing independently to each RGB color of the video signals, there is concern that color change might occur.

In predetermined tone mapping processing, there is need to perform processing equivalent independently to each RGB color, so that color does not change. In a case where the color of one pixel that is the object of predetermined tone mapping processing is configured of luminance of each RGB color situated spanning the point of knee curve, the RGB balance after the predetermined tone mapping processing will be lost, and the color will change before and after tone mapping processing. That is to say, if a first color of RGB (e.g., R) is a luminance in a luminance range to which a knee curve is not applied, and a second color of RGB (e.g., B) that differs from the first color of RGB is a luminance in a luminance range to which a knee curve is applied, the luminance does not change regarding luminance in the luminance range to which the knee curve has not been applied, but luminance slightly changes regarding the luminance in the luminance range to which the knee curve is applied. Accordingly, the relative relationship among the RGB luminances is lost between before and after the predetermined tone mapping processing, and change of color occurs. Even if the value of each RGB color is a luminance within the luminance range where the knee curve is applied, the rate of change where the luminance is reduced in accordance with the magnitude of luminance is different in the luminance range where the knee curve is applied, so the relative relationship among the RGB luminances is lost. Accordingly, complex three-dimensional color conversion processing and so forth has been necessary in order to reduce change in color between before and after the predetermined tone mapping processing.

Particularly, in a case of organic light-emitting displays (OLED) where contrast is extremely high, performing knee curve processing on absolute luminance reference HDR signals causes the color to change even if the color reproducibility of OLEDs is high, so there has been the problem that display capabilities of OLEDs could not be sufficiently brought out.

In light of the above studies, the present inventor has studied the following improvements to solve the above problem.

A display method according to an aspect of the present disclosure is a display method of displaying, on a display device, video of video data including peak luminance information indicating peak luminance of the video, where luminance of video is defined by a first EOTF indicating a correlation of HDR luminance and code values. The method includes: acquiring the video data; performing first conversion where the luminance of the video is converted to a luminance corresponding to a dynamic range of a third EOTF, where, with regard to a second EOTF that is part of the first EOTF and is the part of a luminance range where the peak luminance indicated by the peak luminance information included in the acquired video data is the maximum luminance, the dynamic range of luminance of the second EOTF is reduced with the maximum luminance of the second EOTF matching the displayable luminance of the display device, while maintaining the relative relationship of luminance of the second EOTF; and displaying the video on the display device using the result of the first conversion.

According to this, the dynamic range of luminance of video compatible with HDR can be converted in accordance with the displayable luminance of the display device, without performing luminance changing processing such as knee curve processing. Accordingly, luminance conversion of video of video data in accordance with the luminance of the display device can be easily performed, and change in color between before and after conversion can be suppressed.

The third EOTF may be an EOTF where the dynamic range of luminance of the second EOTF is reduced with the maximum luminance of the second EOTF matching the displayable luminance, while maintaining the relative relationship of luminance of the second EOTF, by multiplying a value, obtained by dividing the displayable luminance by the peak luminance, by a variable representing luminance in the second EOTF.

Accordingly, luminance conversion of video of video data in accordance with the luminance of the display device can be easily performed, and change in color between before and after conversion can be suppressed.

The display method may further include: performing first determining of whether or not the peak luminance that the peak luminance information indicates exceeds a predetermined luminance stored beforehand by the display device; in a case where a result of the first determining is that the peak luminance exceeds the predetermined luminance, performing second conversion including a third conversion of converting luminance in a luminance range in luminances of the video, from the predetermined luminance of the second EOTF to the peak luminance, to a luminance of a luminance range from a first luminance corresponding to an upper limit value of a narrow range that is narrower than a full range stipulating a range of code values of a fourth EOTF that the display device stores beforehand, and a second luminance corresponding to an upper limit value of the full range, and a fourth conversion of converting a fifth EOTF that is part of the second EOTF and is the part of the luminance range where the predetermined luminance is the maximum luminance, to a sixth EOTF, where the dynamic range of luminance of the fifth EOTF is reduced with the maximum luminance of the fifth EOTF matching the first luminance, while maintaining the relative relationship of luminance of the fifth EOTF, and converting, of the luminances of the video, luminance of the dynamic range of the fifth EOTF to the dynamic range of luminance of the corresponding sixth EOTF; and displaying the video on the display device using the result of the second conversion.

According to this, in a case where the peak luminance is found to exceed a predetermined luminance as a result of the first determining, the second conversion is performed and not the first conversion. In this way, in a case where the peak luminance exceeds a predetermined luminance, luminance conversion processing with the relative relationship of luminance maintained (first conversion) is not performed, thereby suppressing the appearance from greatly changing due to the low-luminance range becoming too dark, even though the relative relationship of luminance between before and after the luminance conversion processing is maintained.

In the third conversion, of the luminances of the video, luminance in a luminance range from the predetermined luminance to the peak luminance of the second EOTF may be converted to where a linear relationship is satisfied between a set of the first luminance and upper limit value of the narrow range and a set of the second luminance and upper limit value of the full range.

In a case where the peak luminance is found to be the predetermined luminance or lower as a result of the first determining, conversion of reducing the dynamic range of luminance of the second EOTF with the peak luminance matching the first luminance serving as the displayable luminance may be performed as the first conversion.

According to this, in a case where the peak luminance is found to be the predetermined luminance or lower as a result of the first determining, the first conversion is performed and not the second conversion, so even easier conversion processing can be performed in a case where there is little possibility that the appearance will greatly change before and after the conversion processing. Accordingly, the processing load can be reduced.

The full range may be a range of integer values of code values from 0 to 1023, and the narrow range may be a range of integer values of code values from 64 to 940.

The video data may further include maximum frame average luminance information indicating maximum frame average luminance that is a maximum value of average luminance of each of a plurality of frames making up the video. Second determining may be performed of whether or not the maximum frame average luminance that the maximum frame average luminance information indicates is ½ of the peak luminance or lower. In a case where the maximum frame average luminance is found to be ½ of the peak luminance or lower as a result of the second determining, the second conversion may be performed using a value that is double the maximum frame average luminance, as the predetermined luminance.

Thus, by performing second determining, whether or not the proportion of pixels having luminance at the peak luminance or near the peak luminance in the video of the video data is great can be determined, and in a case of determining to be few, the second conversion is performed using a value twice the maximum frame average luminance, so the luminance of the video can be converted and displayed maintaining the gradation in the middle tone and dark portions better. Accordingly, loss of gradation in the middle tone and dark portions in the video can be maximally suppressed.

The display method may further include: performing third determining of determining whether or not change in luminance between two consecutive sectional videos out of a plurality of sectional videos making up the video is sudden, using the peak luminance information, and sectional peak luminance information indicating sectional peak luminance that is peak luminance of that sectional video, included in the acquired video data for each of the plurality of sectional video; converting the dynamic range of luminance of at least one of the two sectional videos so that the change in luminance comes within a predetermined range, in a case where the result of the third determining is that the luminance change is sudden; and performing the first conversion in which the EOTF in the dynamic range where the sectional peak luminance indicated by the sectional peak luminance information corresponding to this sectional video is the maximum luminance is the second EOTF, for each of the two sectional videos, in a case where the result of the third determining is that the luminance change is not sudden.

Thus, processing is switched in accordance with whether sudden change in luminance occurs between consecutive sectional videos, so the video can be suppressed from suddenly becoming dark or becoming bright, and loosing unity of the overall video can be suppressed.

The display method may further include: acquiring environment light in space where the display device is installed; performing fourth determining of determining whether or not the acquired environment light is bright; performing, in a case where the result of the fourth determining is that the environment light is bright, conversion using a seventh EOTF as the third EOTF, where the dynamic range of luminance of the second EOTF has been reduced to match displayable luminance that is the display peak luminance of the display device, as the first conversion; and performing, in a case where the result of the fourth determining is that the environment light is dark, conversion using an eighth EOTF as the third EOTF, where the dynamic range of luminance of the second EOTF has been reduced to match a luminance lowered by a predetermined percentage from the display peak luminance serving as the displayable luminance, as the first conversion.

Accordingly, display in accordance with the brightness of the viewing environment can be easily realized, even in a case of displaying video regarding which display at absolute luminance is assumed on the display device.

The displayable luminance may be the display peak luminance of the display device.

Accordingly, the luminance of the video can be converted and display in accordance with the display peak luminance of the display device.

Note that these general or specific embodiments may be implemented as a device, a system, an integrated circuit, a computer program, or a computer-readable recording medium such as a CD-ROM or the like, and may also be implemented as any selective combination of a device, a system, an integrated circuit, a computer program, and a recording medium.

A display method and display device according to an aspect of the present disclosure will be described below in detail with reference to the attached drawings.

Note that the embodiments described below are each general or specific examples of the present disclosure. Values, shapes, materials, placements and connected states of components, steps, order of steps, and so forth, illustrated in the following embodiments, are only exemplary, and do not restrict the present disclosure. Components in the following embodiments which are not included in an independent Claim indicating the highest concept are described as being optional components.

The present disclosure relates to an HDR signal format, a display method of the HDR signals, and a display device, to realize display of HDR (High Dynamic Range) signals that are high luminance signals with a high dynamic range, encoded by the SMPTE (Society of Motion Picture & Television Engineers) ST 2084 standard EOTF (hereinafter referred to as "PQ curve"), on a display device (e.g., TV, projector, tablet, smartphone, etc.) that has different display capabilities of dynamic range of luminance from the peak luminance (maximum luminance or highest luminance) in the dynamic range of luminance that the HDR signals correspond to.

First Embodiment

A first embodiment will be described below with reference to FIGS. 6 through 14. First, the flow of processing from shooting an image up to displaying the image on a display unit will be described in order by way of FIGS. 6 through 11B.

1-1. Idea of Scale of Luminance when Shooting Images

Figure 6:
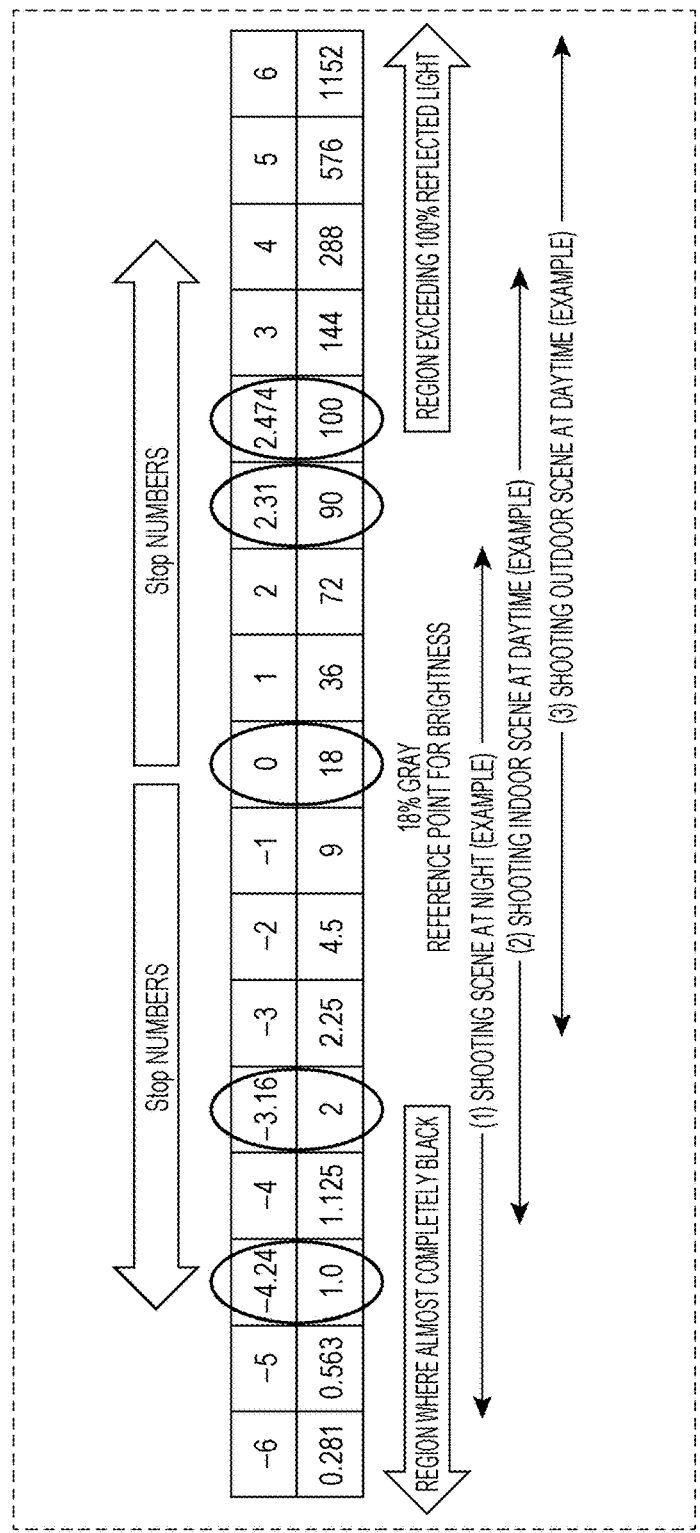
FIG. 6 is a diagram illustrating a scale for luminance when shooting images.

FIG. 6 is a diagram illustrating a scale for luminance when shooting images. It can be seen from FIG. 6 that in a case of shooting an image with a camera, 18% gray, which is gray where the reflectance is 18%, is used as a reference point of brightness for shooting. That is to say, 18% gray is a reference reflectance serving as a reference of brightness. Stop numbers are defined increasing by one each time the luminance doubles, with the luminance at 18% gray as the reference point.

When actually shooting images with a camera, the luminance obtained by the image sensor (e.g., CMOS, charge-coupled device (CCD), etc.) of the camera changes in accordance with change in exposure due to aperture, shutter speed, sensitivity settings, and so forth. That is to say, even of subjects with the same brightness are shot, the luminance obtained from the image sensor will be different values depending on the exposure. Accordingly, the Stop number values themselves are not absolute values, but relative values. That is to say, luminance cannot be expressed by Stop numbers.

For example, in a case of a night scene of (1) in FIG. 6, in order to avoid clipped blacks, exposure is changed by reducing the shutter speed, increasing the aperture, etc., thereby setting the exposure at the camera so as to retain the gradients at dark portions while abandoning bright portions.

In the case of shooting an indoor scene at daytime of (2) in FIG. 6, the exposure is set at the camera so that the balance between dark portions and bright portions is good. In the case of shooting an outdoor scene at daytime of (3) in FIG. 6, exposure settings are made at the camera with reduced exposure to prevent white clipping at bright portions.

Thus, there has been the need to calculate the relative relationship as to 18% gray, in order to convert the relative luminance obtained in this way into an absolute luminance.

1-2. Luminance when Shooting Image

Figure 7:
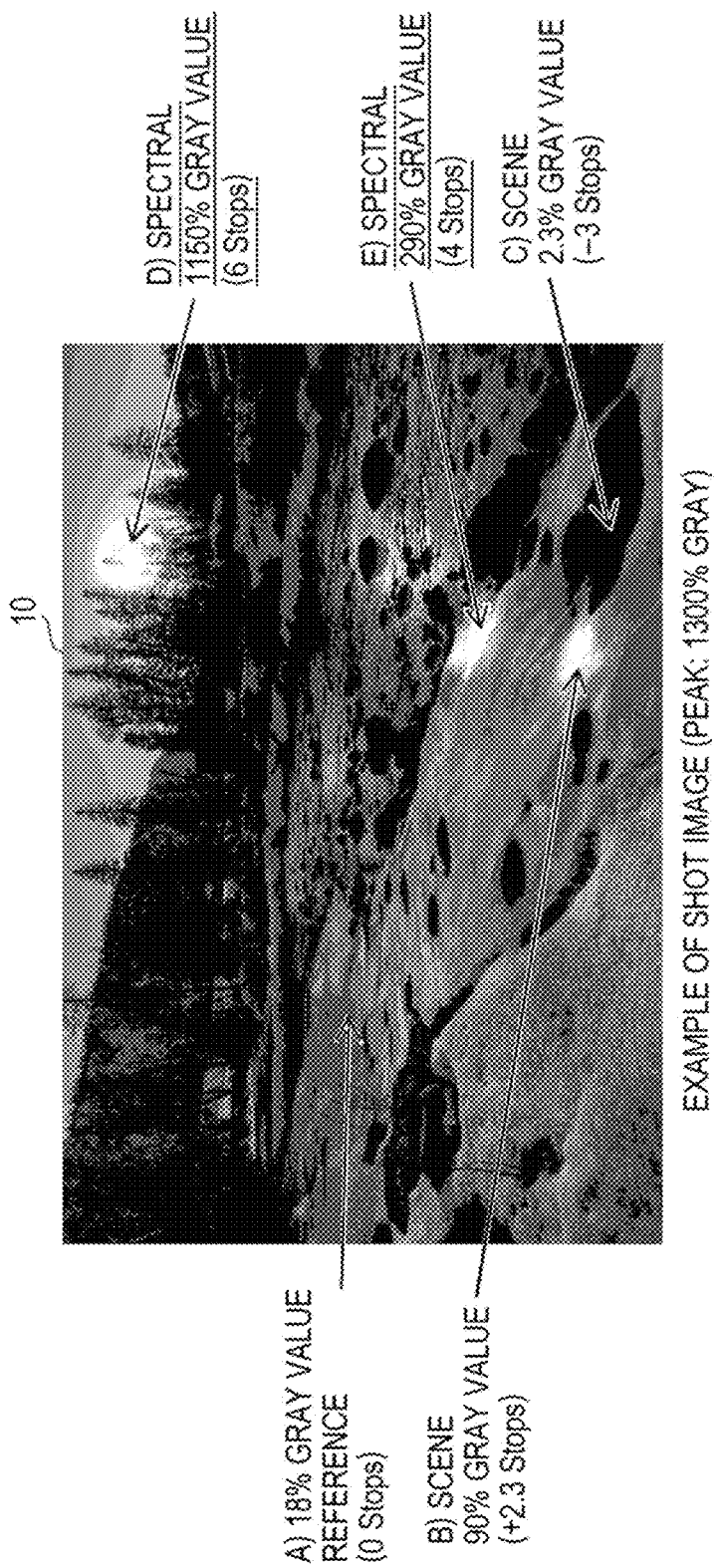
FIG. 7 is a diagram illustrating an example of luminance of an image that has been shot.

FIG. 7 is a diagram illustrating an example of luminance of an image that has been shot. In FIG. 7, A) in an image 10 that has been shot (hereinafter referred to as "original image") indicates pixels having a luminance corresponding to 18% gray (0 Stop) that is the reference reflectance serving as the reference for brightness (hereinafter referred to as "reference luminance" or "18% Gray value"). B) in 10 indicates pixels having luminance corresponding to 90% reflectance (90% gray) (2.3 Stops). C) in 10 indicates pixels having luminance corresponding to 2.3% gray (−3 Stops) that is almost black. D) in 10 indicates pixels obtained by shooting the sun, yielding luminance that is extremely bright, having luminance corresponding to 1150% gray (6 Stops). E) in 10 indicates pixels obtained by shooting portions with mirror reflection, having luminance corresponding to 290% gray (4 Stops).

Figure 8:
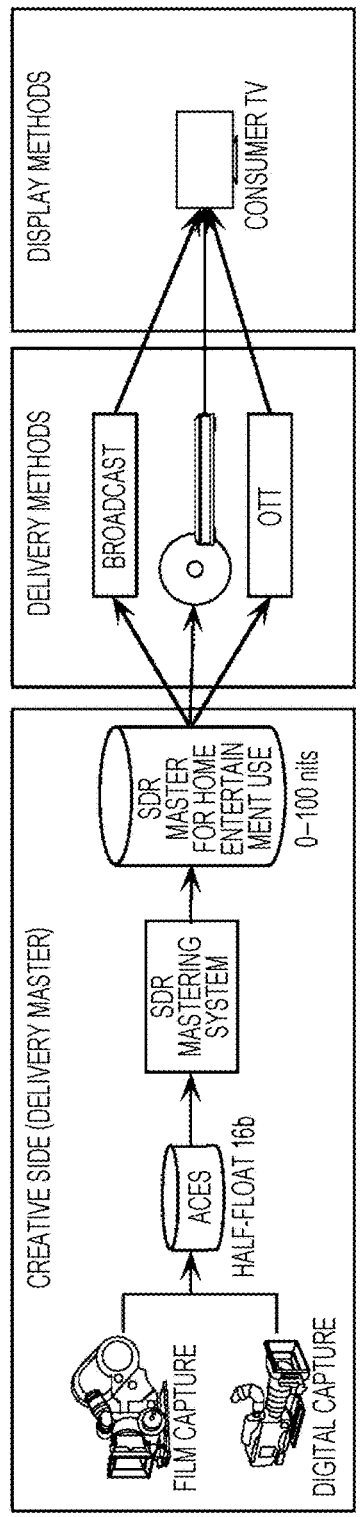
FIG. 8 is a diagram for describing the relationship between a flow of creating a master for SDR-capable home entertainment, a distribution medium, and a display device.

1-3. Relationship Between Master Generation, Distribution Method, and Display Device FIG. 8 is a diagram for describing the relationship between a flow of creating a master for SDR-capable home entertainment, a distribution medium, and a display device. The original image 10 described in FIG. 7 is an image of which the maximum luminance is 1300 nits. That is to say, in a case of creating a master image (SDR image) corresponding to SDR in which the maximum luminance is 100 nits using the original image 10, an SDR-capable master image cannot be created using the luminance of the original image as it is without conversion, since SDR cannot express pixels having luminance exceeding 100 nits. That is to say, in order to create an SDR-capable master image using the original image 10, the luminance of the original image needs to be converted into luminance of a dynamic range that is compatible with SDR.

[1-4. Mastering from Original Image to SDR Image]

Next, SDR grading processing (mastering processing) from the original image 10 to an SDR image will be described. First, in order to adapt video (image) of contents having high-luminance components exceeding 100 nits, shot by a camera, to a broadcasting standard such as Bt709 or the like, luminance is maintained linearly to around 80 nits or so by normal grading processing, and knee curve processing is performed at portions above that to keep the maximum luminance within 100 nits. Specifically, knee curve processing is processing where luminance at a certain value or lower is linearly displayed, and luminance at a certain value or higher is attenuated in accordance with the display peak luminance of the display device on which display is to be performed.

Figure 9A:
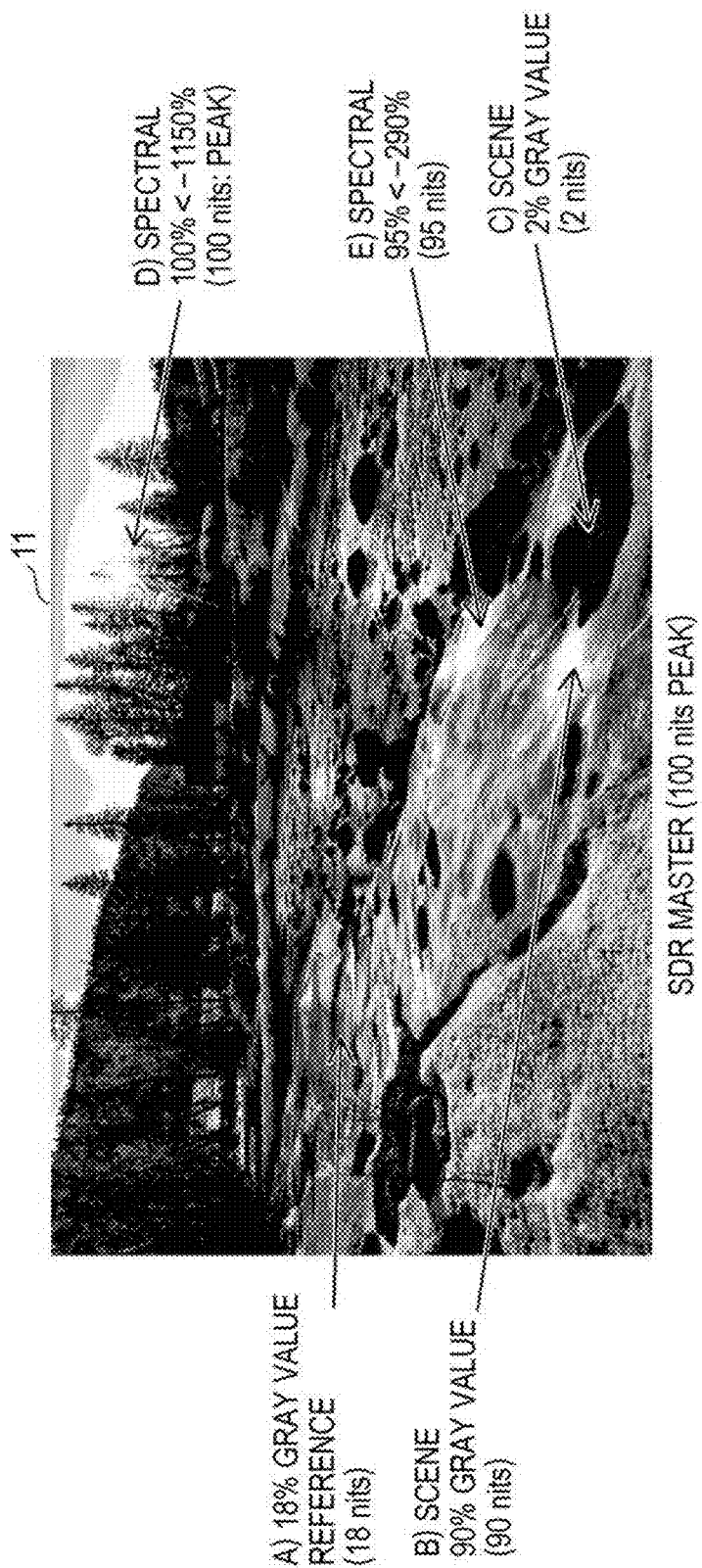
FIG. 9A is a diagram illustrating an example of luminance as a result of having mastered the original image illustrated in FIG. 7 to an SDR image.
Figure 9B:
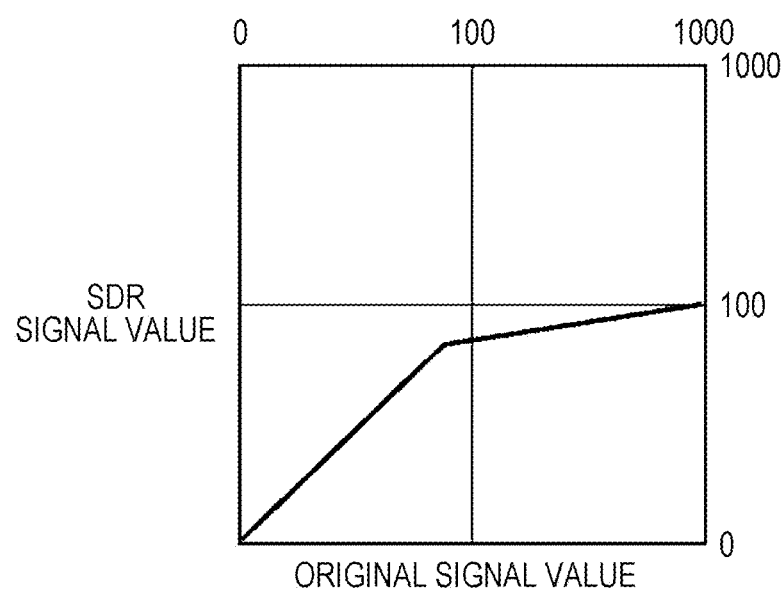
FIG. 9B is a diagram illustrating an example of the relationship between original signal values and SDR signal values, for converting (mastering) original signal values into SDR signal values.

FIG. 9A is a diagram illustrating an example of luminance as a result of having mastered the original image illustrated in FIG. 7 to an SDR image. FIG. 9B is a diagram illustrating an example of the relationship between original signal values and SDR signal values, for converting (mastering) original signal values into SDR signal values. Note that the original signal values are luminance in a dynamic range of 0 to 1300 nits in the original image 10 (hereinafter referred to as "luminance of original image"), and SDR signal values are luminance in the SDR luminance range (hereinafter referred to as "SDR luminance").

In the mastering from the original image 10 to an SDR image 11 in this example, pixels having a luminance corresponding to 18% gray (0 Stop) that is the reference reflectance are pixels having the reference luminance that is the reference for brightness, as illustrated in FIG. 9B. Accordingly, in the mastering to SDR image, the luminance of the pixels corresponding to 18% gray (18 nits) in the original image 10 is not changed even after converting the original image 10 into the SDR image 11, and is decided as the luminance for SDR.

In the mastering from the original image 10 to the SDR image 11 in this example, the luminance of the original image is not changed in the luminance range at or below the luminance of the pixels corresponding to 90% gray (90 nits) in the original image 10 (0 to 90 nits), and is decided as the luminance for SDR, as illustrated in FIG. 9B. Also, the luminance of the original image in the luminance range exceeding the luminance of the pixels corresponding to 90% gray (90 nits) in the original image 10 (91 to 1300 nits) is allocated to SDR luminance in the luminance range of 90 to 100 nits by linear conversion, as illustrated in FIG. 9B.

In mastering of pixels corresponding to 90% gray (2.3 Stops), indicated by B) in FIG. 9A, out of the pixels in the original image 10, to the SDR image 11 for example, the luminance of the pixels corresponding to 90% gray (90 nits) in the original image 10 is not changed even after converting the original image 10 into the SDR image 11, and is decided as the luminance for SDR.

Also, in mastering of pixels corresponding to 2.3% gray (−3 Stops) indicated by C) in FIG. 9A, out of the pixels in the original image 10, to the SDR image 11 for example, the luminance of the pixels corresponding to 2.3% gray (2 nits) in the original image 10 is not changed even after converting the original image 10 into the SDR image 11, and is decided as the luminance for SDR, in the same way as described above.

In mastering of pixels corresponding to 1150% gray (6 Stops), indicated by D) in FIG. 9A, out of the pixels in the original image 10, to the SDR image for example, the luminance of the pixels corresponding to 1150% gray (1150 nits) in the original image 10 is converted to 100 nits that is the maximum luminance for SDR.

Also, mastering of pixels corresponding to 290% gray (4 Stops), indicated by E) in FIG. 9A, out of the pixels in the original image 10, to the SDR image for example, the luminance of the pixels corresponding to 290% gray in the original image 10 is converted to 95 nits.

1-5. First Mastering from Original Image to HDR Image

Figure 10B:
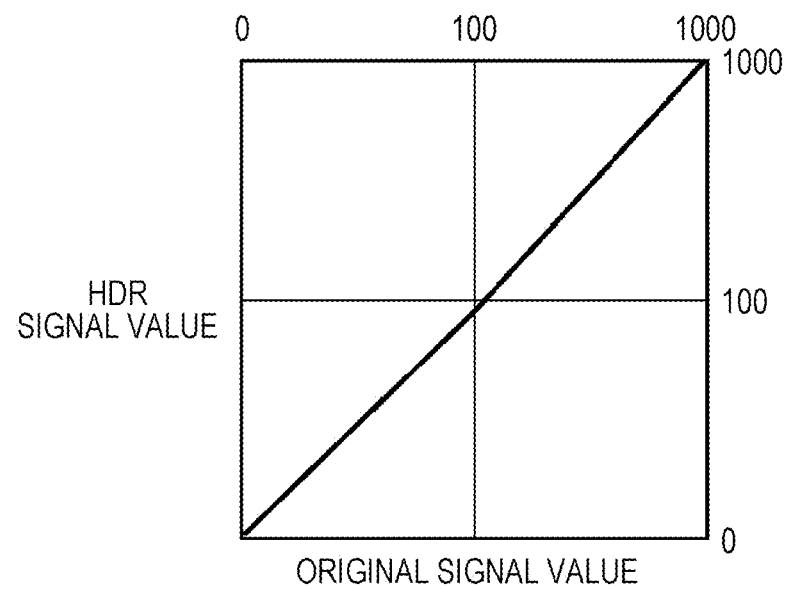
FIG. 10B is a diagram illustrating an example of the relationship between original signal values and HDR signal values, for converting (mastering) original signal values into HDR signal values.

FIG. 10A is a diagram illustrating an example of luminance as a result of having mastered the original image illustrated in FIG. 7 to an HDR image. FIG. 10B is a diagram illustrating an example of the relationship between original signal values and HDR signal values, for converting (mastering) original signal values into HDR signal values. Note that HDR signal values are luminance in the HDR luminance range (hereinafter referred to as "HDR luminance"). Note that in the mastering from the original image to an HDR image in this example, allocation of luminance up to 2000 nits as luminance for HDR is permitted, so the luminance of the original image can be maintained without change in the HDR image as well.

For example, pixels having a luminance corresponding to 18% gray (0 Stop) that is the reference reflectance are pixels having the reference luminance that is the reference for brightness, indicated by A) in FIG. 10A, out of the pixels in the original image 10, so in the mastering to HDR image, the luminance of the pixels corresponding to 18% gray (18 nits) in the original image 10 is not changed even after converting the original image 10 into an HDR image 12, and is decided as the luminance for HDR.

In the same way, in the mastering to HDR image, the luminance of the original image is not changed for each of pixels corresponding to 90% gray (2.3 Stops) indicated by B), pixels corresponding to 2.3% gray (−3 Stops) indicated by C), pixels corresponding to 1150% gray (6 Stops) indicated by D), and pixels corresponding to 290% gray (4 Stops) indicated by E), for example, and is decided as the luminance for HDR.

1-6. Specific Example of Luminance Conversion

Figure 11A:
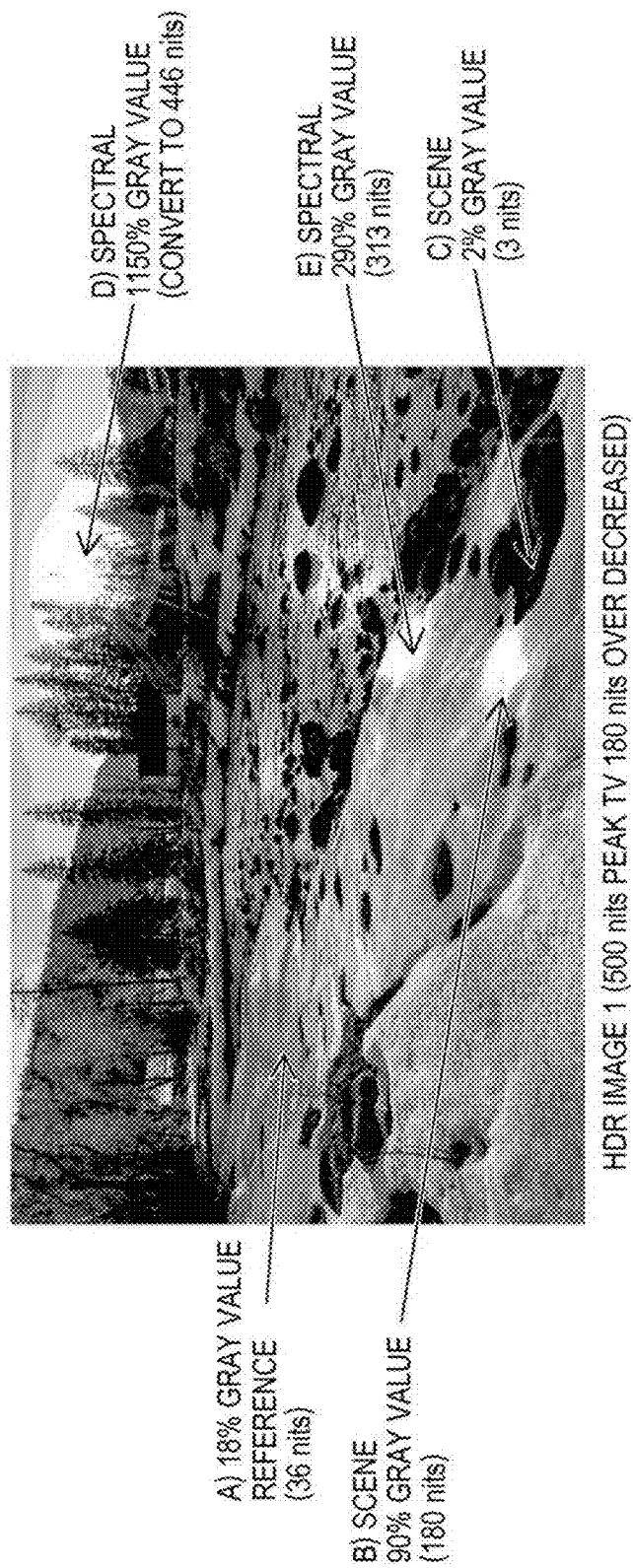
FIG. 11A is a diagram illustrating an example of results of acquiring an HDR image obtained by the mastering in FIG. 10A, and performing luminance conversion for a display device of which second maximum luminance is 500 nits.
Figure 11B:
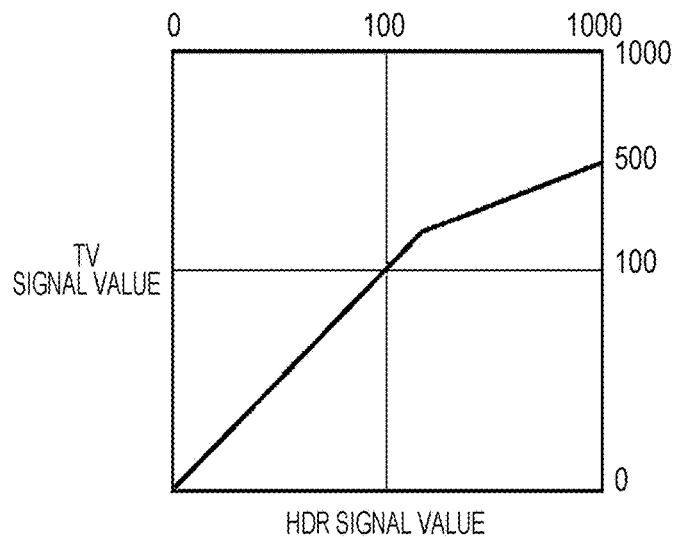
FIG. 11B is a diagram illustrating an example of the relationship between HDR signal values and TV signal values, for conversion of HDR signal values into TV signal values.

FIG. 11A is a diagram illustrating an example of results of acquiring an HDR image obtained by the mastering in FIG. 10A, and performing luminance conversion for a display device of which second maximum luminance is 500 nits. FIG. 11B is a diagram illustrating an example of the relationship between HDR signal values and TV signal values, for conversion of HDR signal values into TV signal values. In this example, the second maximum luminance that the HDR TV can display is restricted to 500 nits. Accordingly, the HDR luminance that the HDR signals represent need to be converted to the display luminance in the luminance range of the display.

HDR signals are acquired, and luminance corresponding to 18% gray (0 Stop) that is the reference for brightness (reference luminance) is extracted from the acquired HDR signals. The HDR signals indicating the luminance in the HDR image 13 have 36 nits as the reference luminance, so it can be known that the creator has intentionally changed the reference luminance. Accordingly, the values of luminance indicated by the HDR signals are maintained without change for luminance corresponding to 90% gray (180 nits) and lower, while the values of luminance indicated by these HDR signals exceeding luminance corresponding to 90% gray (180 nits) is linearly converted to where the first maximum luminance that these HDR signals indicate (HDL peak luminance (HPL): 1300 nits) become the second maximum luminance displayable on the HDR TV (display peak luminance (DPL): 500 nits).

That is to say, in the luminance conversion (S304) in this example, in a case where the reference luminance is a third reference value (36 nits) that is difference from a first reference value (18 nits), the HDR luminance indicated by the HDR signals is decoded to be the display luminance for HDR signals indicating luminance of a fourth reference value (90 nits) and below that is greater than 36 nits. Also, in the luminance conversion (S304), the HDR signals indicating luminance exceeding 90 nits are subjected to linear conversion for HDR luminance from 90 nits to the second maximum luminance (DPL) that is displayable on the HDR TV, so that the first maximum luminance (HPL) is made to correspond to the second maximum luminance (DPL), thereby converting the HDR luminance to display luminance.

By performing luminance conversion in this way, the luminances of pixels A) corresponding to 18% gray in the HDR image 13, pixels B) corresponding to 90% gray in the HDR image 13, and pixels C) corresponding to 2.3% gray in the HDR image 13, are not changed, and the luminance of the HDR image 13 is decided as the display luminance. Regarding the pixels D) corresponding to 1150% gray in the HDR image 13, 446 nits obtained by performing the above-described linear conversion is decided as the display luminance, and for the pixels E) corresponding to 290% gray in the HDR image 13, 313 nits obtained by performing the above-described linear conversion is decided as the display luminance.

1-7. Display Device and Display Method

Figure 12:
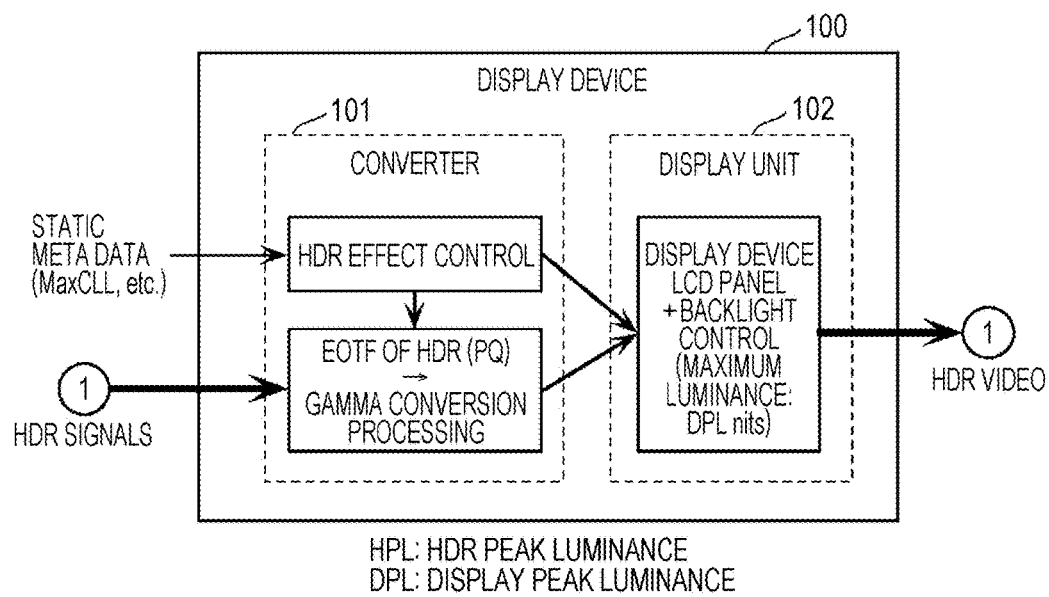
FIG. 12 is a diagram illustrating a functional block diagram of a display device according to a first embodiment.
Figure 13:
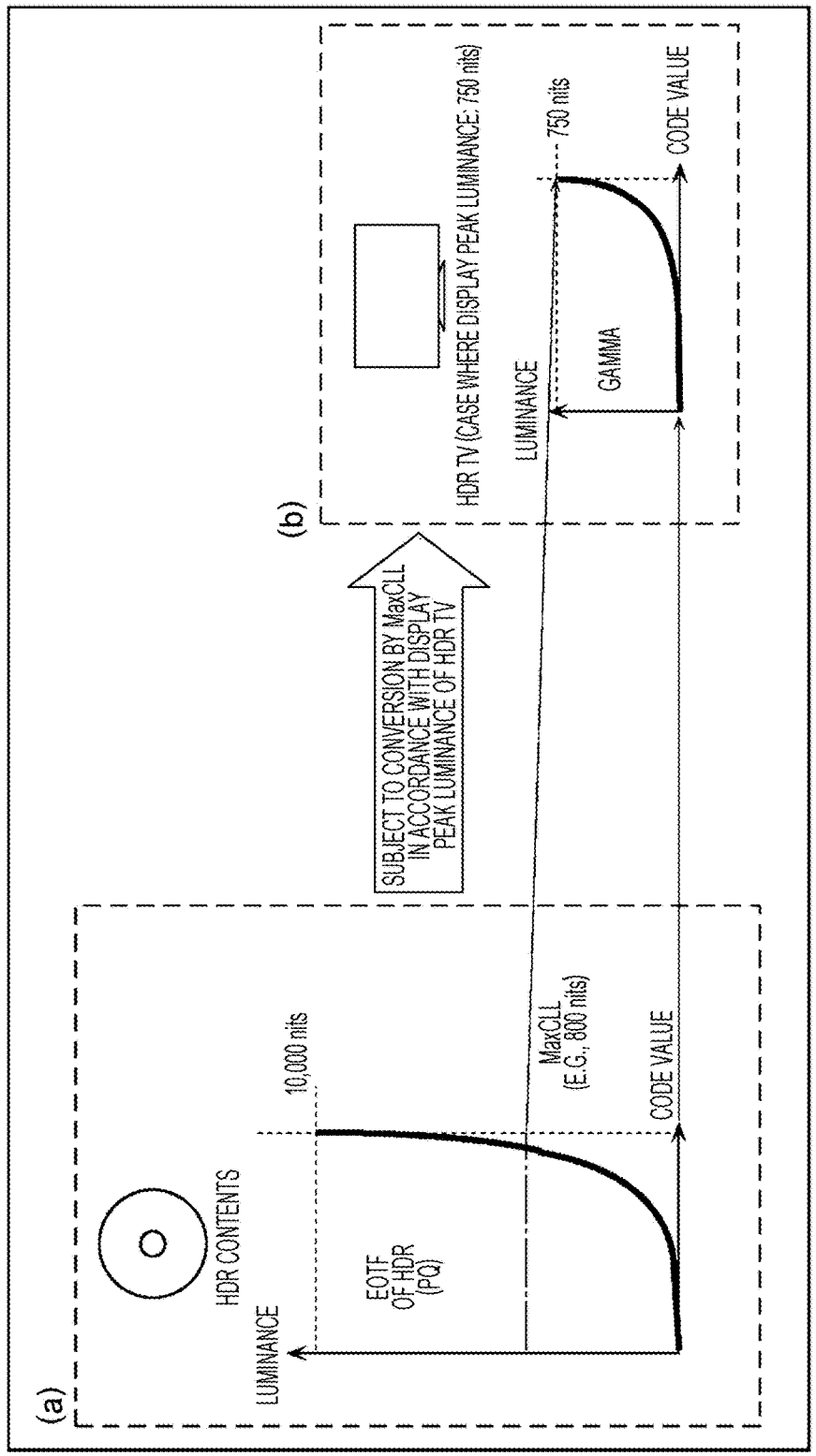
FIG. 13 is a diagram for describing a specific example of conversion processing (first conversion) at a converting unit of a display device.

Next, the display device for performing the display method according to the first embodiment will be described with reference to FIGS. 12 and 13. FIG. 12 is a diagram illustrating a functional block diagram of a display device according to a first embodiment. FIG. 13 is a diagram for describing a specific example of conversion processing (first conversion) at a converting unit of a display device. A display device 100 has a converter 101 and a display unit 102, as illustrated in FIG. 12. The display device 100 is an HDR display device capable of display HDR video, for example, such as an HDR TV, HDR-capable display, or the like.

The converter 101 acquires video data including HDR signals and static metadata (peak luminance information per title (The Maximum Content Light Level (MaxCLL)). The converter 101 controls the HDR effects in accordance with the acquired static metadata, and performs processing of converting from the PQ curve to the gamma curve in the luminance range that the display unit 102 can handle. The converter 101 specifically converts a portion of the PQ curve on up into a gamma curve matching the display peak luminance of the HDR TV (third EOTF), without changing the relative relationship in luminance of the PQ curve in the luminance range of 0 to 800 nits (second EOTF), so as to match the value of MaxCLL (e.g., 800 nits) to the display peak luminance of the HDR TV (e.g., 750 nits), as illustrated in FIG. 13. The converter 101 is realized by a processor, memory storing a program, and so forth, for example.

In other words, the converter 101 performs first conversion of converting the luminance of the video, in which, with regard to the second EOTF that is a part of the PQ curve that is the first EOTF, the maximum luminance of the second EOTF is converted to luminance corresponding to the dynamic range of the third EOTF where the dynamic range of the luminance of the second EOTF has been reduced to match the displayable luminance (e.g., peak luminance) of the display unit 102 of the display device 100. Note that the displayable luminance of the display unit 102 in this case specifically is the display peak luminance of the display unit 102. Thus, the converter 101 does not perform tone mapping processing using a knee curve that requires complicated circuits when displaying, on an HDR TV, video data of HDR contents of which the luminance is defined by the PQ curve, so change in color of the pixels in the video at the converter 101 between before and after the first conversion can be suppressed.

Note that the first EOTF represents the correlation between HDR luminance and code values. The second EOTF is a part of the first EOTF that has been clipped out, as a luminance range where 0 nits is the minimum luminance, and the peak luminance indicated by the peak luminance information included in the acquired video data is the maximum luminance.

Further, the third EOTF is an EOTF where the dynamic range of luminance of the second EOTF has been reduced so that the maximum luminance of the second EOTF matches the displayable luminance, while maintaining the relative relation of luminance in the second EOTF, by multiplying a value, obtained by dividing the displayable luminance by peak luminance indicated in the peak luminance information, by a variable representing luminance in the second EOTF that is a part of the PQ curve, for example. That is to say, the relative relationship of luminance in the second EOTF is the ratio in sets of multiple luminances and code values correlated by the second EOTF, between multiple luminances correlated with mutually different multiple code values. Accordingly, to say to convert while maintaining the relative relationship of luminance in the second EOTF means, in a case where there are a first pre-conversion luminance on the second EOTF, and a second pre-conversion luminance on the second EOTF that differs from the first pre-conversion luminance, and in a case where the first pre-conversion luminance after conversion is a first post-conversion luminance and the second pre-conversion luminance after conversion is a second post-conversion luminance, conversion is performed such that a first ratio between the first pre-conversion luminance and the second pre-conversion luminance, and a second ratio between the first post-conversion luminance and the second post-conversion luminance, are generally equal (so that the error between the first ratio and second ratio after conversion is within a predetermined threshold value).

The display unit 102 displays video using the results of the first conversion at the converter 101. The display unit 102 is realized by a liquid crystal display (LCD) panel, a backlight, an LCD panel driving circuit, a backlight control circuit, and so forth, for example.

Note that the third EOTF is generated with the relative relationship of luminance of the second EOTF, which is part of the PQ curve, being maintained, by the first conversion being performed. Accordingly, the display unit 102 can display video of the video data input with the contrast relationship being maintained from the time of creating the contents. The display unit 102 at this time displays video where the absolute luminance of each pixel is not maintained, but the contrast ratio among the pixels has been maintained at a luminance different from the absolute luminance at time of creating the contents.

Figure 14:
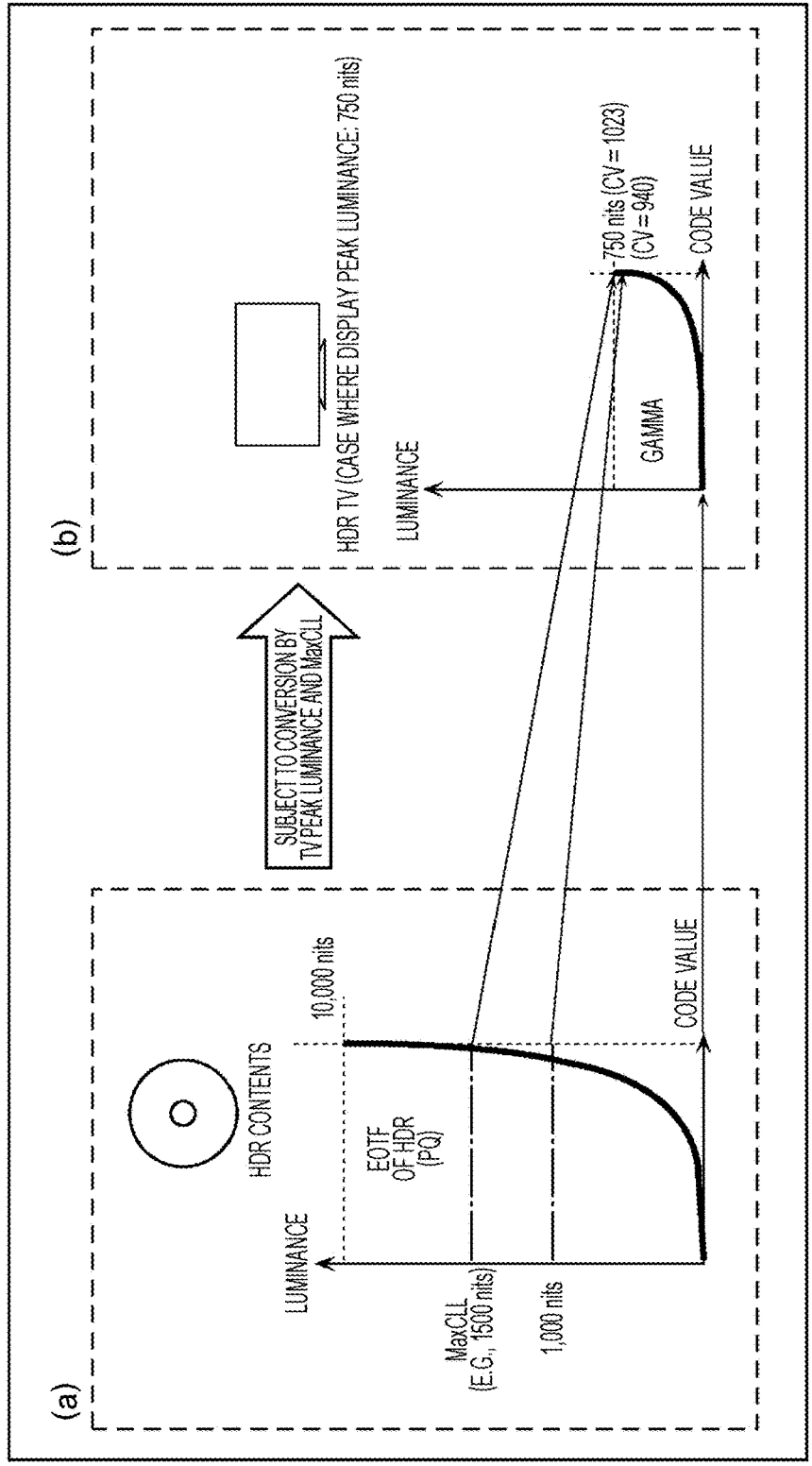
FIG. 14 is a diagram for describing a specific example of other conversion processing at the converting unit.

Next, another specific example of the conversion processing by the converter 101 of the display device 100 will be described. FIG. 14 is a diagram for describing a specific example of other conversion processing at the converting unit.

In a case where the MaxCLL of the video data of the HDR contents exceeds a predetermined luminance (e.g., 1000 nits), performing luminance conversion where the relative correlation is maintained up to MaxCLL reduces the rate of reduction as to the luminance of the overall image, so the luminance in a low-luminance range (e.g., luminance 100 nits and lower) before conversion becomes extremely small after conversion. Accordingly, if luminance conversion processing is performed uniformly maintaining the relative relationship of luminance even if the value of the MaxCLL exceeds the predetermined luminance, this may result in the appearance greatly changing due to the low-luminance range becoming too dark, even though the relative relationship of luminance between before and after the conversion processing is maintained. Accordingly, first conversion is performed where the relative relationship is maintained for a luminance range equal to or below the predetermined luminance out of the luminances of the video, and second conversion that is the same processing as Super White in SDR is performed, handling regions exceeding the predetermined luminance as Sparkle regions.

Specifically, in a case where the MaxCLL of the video data exceeds 1000 nits, the converter 101 performs third conversion where this MaxCLL is set to 1023 that is the upper limit code value (CV) of the full range (see description below), and of the luminances of the video, the luminance in a luminance range from 1000 nits to MaxCLL is linearly expressed, performs fourth conversion where a value corresponding to 1000 nits is set to 940 that is the upper limit code value (CV) of a narrow range (see description below), and of the luminances of the video, the dynamic range of the luminance in a luminance range from 0 nits to 1000 nits is reduced with the relative relationship of luminance maintained in the same way as the first conversion described with reference to FIG. 13, and displays the video using the results of the second conversion, including the third conversion and fourth conversion. On the other hand, in a case where the MaxCLL of the video data is 1000 nits or lower, the converter 101 performs first conversion where the MaxCLL is set to 940 that is the upper limit code value (CV) of narrow range.

In short, the converter 101 performs first determining of whether or not the peak luminance indicated by the peak luminance information exceeds a predetermined luminance (e.g., 1000 nits) stored in the display device 100 beforehand, and selectively performs one of the first conversion and second conversion in accordance with the results of the first determining. Specifically, in a case where the peak luminance is found to exceed the predetermined luminance as a result of the first determining, the second conversion that differs from the first conversion is performed. The second conversion is conversion including the third conversion where luminance is converted in a luminance range from the predetermined luminance to the peak luminance, and fourth conversion where luminance is converted in a luminance range from 0 nits to the predetermined luminance.

In the third conversion, the luminance of video in the luminance range from the predetermined luminance of the second EOTF to the peak luminance indicated by the peak luminance information is converted to luminance in a luminance range from the first luminance corresponding to 940 that is the upper limit of the narrow range of code values to the second luminance 1023 that is the upper limit value of the full range of code values. Also in the third conversion, of the luminances of the video, the luminance in a luminance range from the predetermined luminance of the second EOTF to the peak luminance is converted so that a linear relationship is satisfied between a set of the first luminance and the upper limit value of the narrow range, and a set of the second luminance and the upper limit value of the fill range.

Now, full range is a range stipulating code values of the fourth EOTF stored by the display device 100 beforehand, and is a range of integer values from 0 through 1023 for example, in a case the code values are 10-bit stipulated. That is to say, the full range is a range where the minimum value through the maximum value of integer values that can express the code values of luminance by bit length are used. The narrow range is a range narrower than the full range, and is a range of integer values from 64 through 940 for example, in a case the code values are 10-bit stipulated. That is to say, the narrow range is a range where integer values, of a narrower range than full range, of inverter values that can express the code values of luminance by bit length are used.

In the fourth conversion, a fifth EOTF that is part of the second EOTF and is the part of the luminance range where the predetermined luminance is the maximum luminance, is converted to a sixth EOTF, where the dynamic range of luminance of the fifth EOTF is reduced with the maximum luminance of luminance of the fifth EOTF matching the first luminance, while maintaining the relative relationship of the fifth EOTF, and luminance of the dynamic range of the fifth EOTF of the video is converted to the dynamic range of the sixth EOTF.

On the other hand, in a case where the peak luminance is found to be at or below the predetermined luminance as the result of the first determining, the converter 101 performs conversion where the dynamic range of the luminance of the second EOTF is reduced to match the peak luminance to the first luminance serving as the displayable luminance, as first conversion. In this case, the display unit 102 displays video using the result of the first conversion or the result of the second conversion.

1-8. Advantages, Etc.

According to the display method of the present embodiment, the dynamic range of luminance of video compatible with HDR can be converted to match the display peak luminance of the display device, without performing luminance conversion processing such as knee curve processing. Accordingly, luminance conversion of video of video data compatible with HDR to match the display peak luminance of the display device can be easily performed, and change in color between before and after conversion can be suppressed.

Also, according to the display method of the present embodiment, second conversion rather than first conversion is performed in a case where the result of the first determining finds that the peak luminance exceeds the predetermined luminance. Accordingly, in a case where the peak luminance exceeds the predetermined luminance, luminance conversion processing with the relative relationship of luminance maintained (first conversion) is not performed, thereby suppressing a situation where the appearance greatly changes due to the low-luminance range becoming too dark, even though the relative relationship of luminance between before and after the conversion processing of luminance is maintained.

Also, according to the display method of the present embodiment, in a case where the result of the first determining finds that the peak luminance is at or below the predetermined value, the first conversion is performed rather than the second conversion, so even easier conversion processing can be performed in a case where there is little possibility that the appearance will greatly change before and after the conversion processing. Accordingly, the processing load can be reduced.

1-9. Modification 1

Although 1000 nits, for example, has been used in the above-described embodiment as the predetermined luminance to service as the determination reference for the first determining, the following values may be used. For example, the predetermined luminance may be decided in accordance with the value of the maximum frame average luminance information (The Maximum Frame-Average Light Level (MaxFALL)) indicating the maximum frame average luminance that is the maximum value of average luminance of each of multiple frames making up the video. Note that the maximum frame average luminance information is information included in static metadata included in the video data.

As specific processing, the converter 101 performs second determining to determine whether or not the maximum frame average luminance indicated by the maximum frame average luminance information is ½ or the peak luminance or lower. In a case where there result of the second determining finds that the maximum frame average luminance is ½ the peak luminance or lower, the second conversion is performed using a value double the maximum frame average luminance as the predetermined luminance.

Thus, by performing second determining, whether or not the proportion of pixels having luminance at the peak luminance or near the peak luminance in the video of the video data is great can be determined, and in a case of determining to be few, the second conversion is performed using a value twice the maximum frame average luminance, so the luminance of the video can be converted and displayed maintaining the gradation in the middle tone and dark portions better. Accordingly, loss of gradation in the middle tone and dark portions in the video can be maximally suppressed.

1-10. Modification 2

Although description has been made in the above embodiment that the converter 101 performs first conversion or second conversion on each content using peak luminance information included in the static metadata, this is not restrictive. For example, in a case where dynamic metadata is included in the content, first conversion or second conversion may be performed using dynamic metadata corresponding to each of multiple sectional videos (cuts, series of sequences) making up the video of the video data for this content, instead of the MaxCLL that is static metadata. Note that dynamic metadata is sectional peak luminance information (The Maximum Sequence Light Level (MaxSLL)) indicating the peak luminance of this sectional video (sectional peak luminance), for each of multiple sectional videos. Accordingly, HDR contents can be displayed using peak luminance of the HDR TV more efficiently.

Note that in a case where the sectional peak luminance corresponding to each sectional video is lower than the display peak luminance of the HDR TV, the luminance of that sectional video may be displayed as it is, maintaining the relative relationship and not performing conversion processing of extending in the direction of being brighter.

In a case where the sectional peak luminance corresponding to each sectional video is markedly lower than the peak luminance (e.g., ½ or below), or in a case where the sectional peak luminances of consecutive sectional videos markedly differ (difference of 50% or more), performing the above processing as it is may result in the low-luminance range (dark portions) becoming suddenly bright and unity of the overall image may be lost. Accordingly, sudden change in luminance may be suppressed by not using the sectional peak luminance as it is, but performing correction on the sectional peak luminance (MaxSLL) such as (MaxCLL+MaxSLL)/2, (MaxSLL (x)+MaxSLL (X+1))/2, or the like, and then using the corrected values to perform the above processing.

That is to say, the converter 101 performs third determining to determine whether or not change in luminance between two consecutive sectional videos out of multiple sectional videos is sudden or not, using peak luminance information and sectional peak luminance information included in the acquired video data. In a case where the result of the third determining is that the luminance change is sudden, the converter 101 converts the dynamic range of the luminance of at least one of the two sectional videos so that the change in luminance comes within a predetermined range. In a case where the result of the third determining is that the luminance change is not sudden, the converter 101 performs the first conversion in which the EOTF in the dynamic range where the sectional peak luminance indicated by the sectional peak luminance information corresponding to this sectional video is the maximum luminance is the second EOTF, for each of the two sectional videos. Thus, processing is switched in accordance with whether sudden change in luminance occurs between consecutive sectional videos, so the video can be suppressed from suddenly becoming dark or becoming bright, and loosing unity of the overall video can be suppressed.

Second Embodiment

Next, a second embodiment will be described with reference to FIGS. 15 and 16.

2-1. Problems with Display on HDR TV

The display method of reducing the dynamic range of luminance of video in HDR contents to display on an HDR TV has the following issues, unlike a case of changing the dynamic range of luminance of video in SDR contents to display on an SDR TV.

Figure 15:
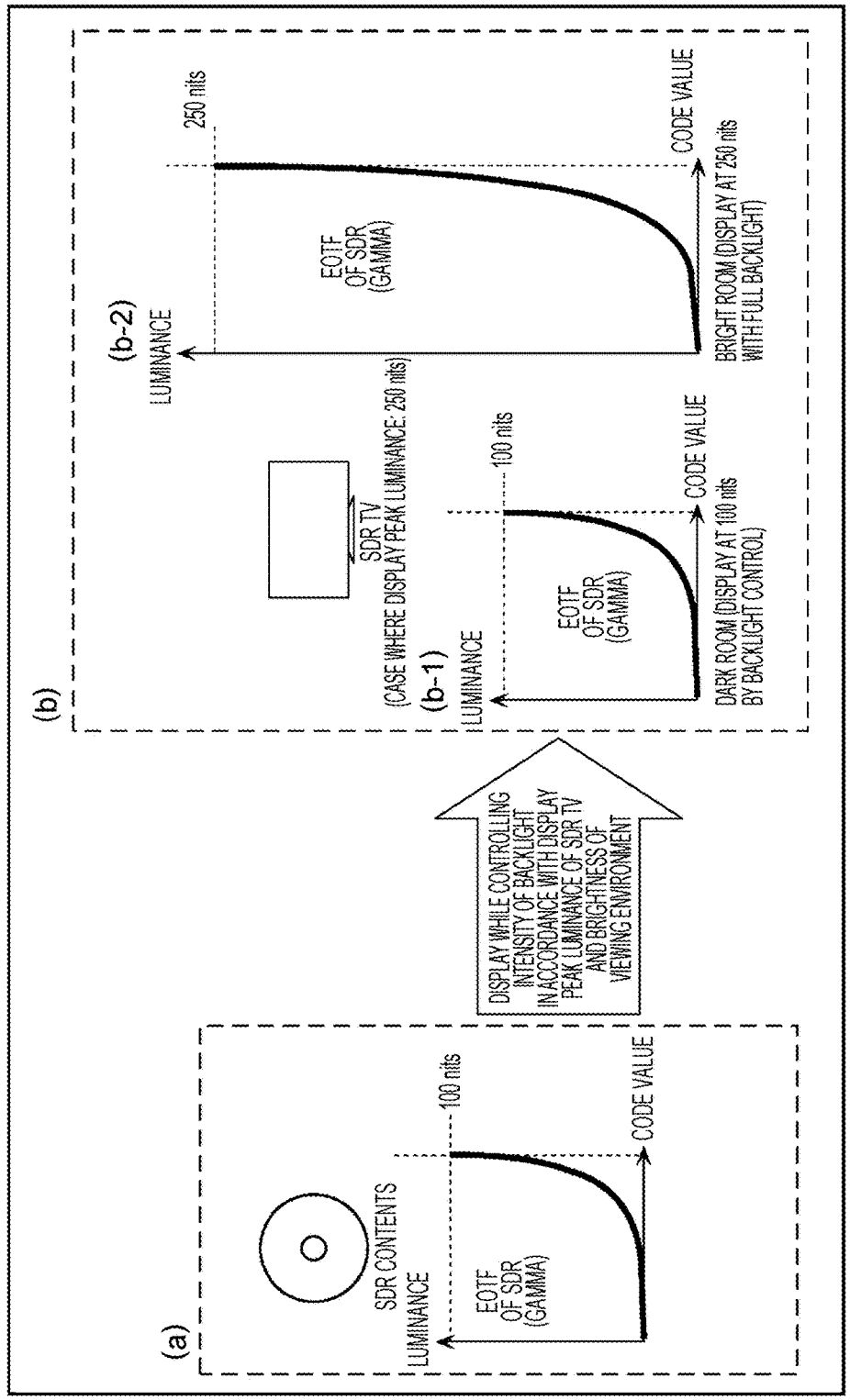
FIG. 15 is a diagram for describing an example of display processing in a case of displaying SDR signals on an SDR TV, in accordance with the brightness of the viewing atmosphere.
Figure 16:
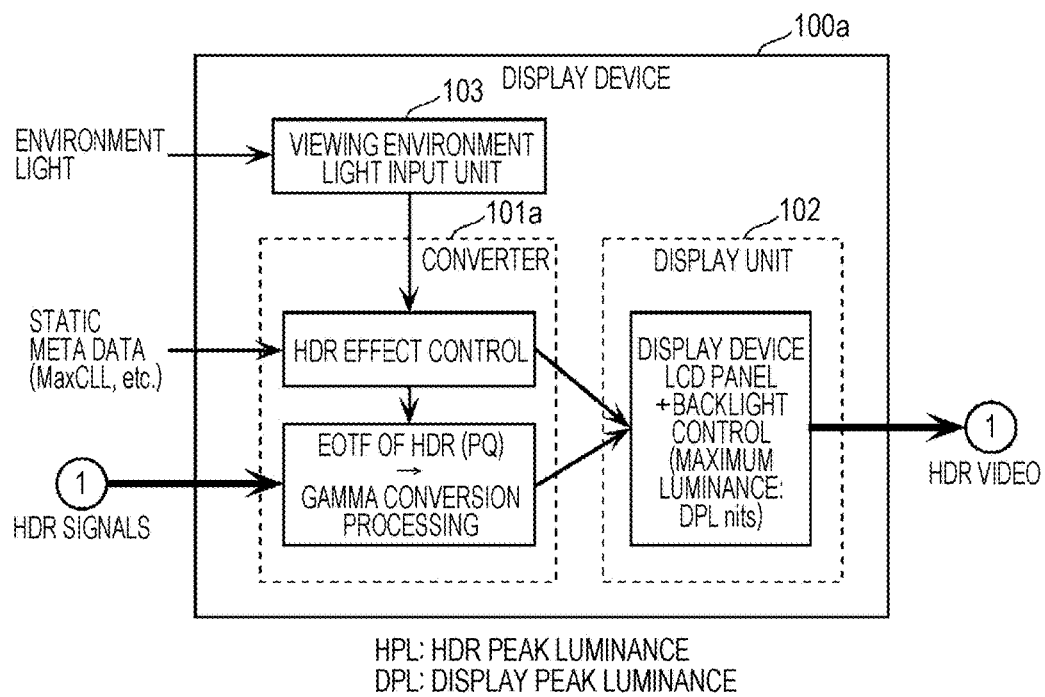
FIG. 16 is a block diagram illustrating functional blocks of a display device according to a second embodiment.

FIG. 15 is a diagram for describing an example of display processing in a case of displaying SDR signals on an SDR TV, in accordance with the brightness of the viewing atmosphere. As described with reference to FIG. 4, SDR TV quantizes SDR signals of SDR contents using an SDR EOTF (gamma curve) to maintain relative luminance (contrast ratio) not absolute luminance in display. Now, there is a method such as illustrated in FIG. 15 where a dimming device is provided to the SDR TV, and the contrast ratio between dark portions and bright portions in the SDR contents is maintained in accordance with the brightness of the viewing environment of the SDR TV, by automatically changing the light emission intensity of the backlight of the display unit in accordance with the brightness of the viewing environment acquired by the dimming device.

In the example in FIG. 15, in a case of displaying the SDR contents corresponding to the EOTF of SDR illustrated in (a) in FIG. 15 on an SDR TV, the display control is changed in accordance with whether the viewing environment is a dark room or a bright room. The SDR TV has capabilities to display the display peak luminance at a luminance (e.g., 250 nits) exceeding 100 nits that is the peak luminance of the dynamic range of the luminance of the EOTF of SDR (gamma curve). In a case where the viewing environment of such an SDR TV is determined to be a dark room, the displayed peak luminance is suppressed to 100 nits as illustrated in (b-1) in (b) in FIG. 15. On the other hand, in a case where the viewing environment of such an SDR TV is determined to be a bright room, the displayed peak luminance is extended to the maximal 250 nits as illustrated in (b-2) in (b) in FIG. 15. Thus, the luminance of video of SDR signals in SDR contents is managed by relative luminance in SDR TV, so changing of the peak luminance of video to be displayed on the SDR TV in accordance with the brightness of the viewing environment while maintaining the relative luminance is easy.

There is demand for not only SDR TV that displays while maintaining the relative relationship of luminance in video of SDR signals, but also HDR TV where video of HDR signals obtained by the absolute luminance of shot video being quantized by the PQ curve, to not be displayed by absolute luminance but to perform display control where the dynamic range of luminance of the video is changed in accordance with the brightness of the viewing environment (dark room, bright room, somewhat bright room, etc.). That is to say, there is demand for HDR TV to be able to provide viewers with maximally similar HDR effects even if the brightness of the viewing environment changes, by performing display control to perform display while maintaining an appropriate contrast ratio, the same as with SDR TV.

However, HDR video of HDR contents is created by the content creator assuming display by absolute luminance, so even if the method of converting the luminance of the video while maintaining the relative luminance of luminance of the video as it is, is directly applied to HDR signal video, displaying video of appropriate luminance on the display unit is difficult.

Also, in the case of HDR video of HDR contents, the peak luminance is often around 800 to 4000 nits, exceeding the peak luminance of normal HDR TVs. Accordingly, there is the need to set the light emission intensity of the backlight to maximum in order to display peak luminance of HDR video even in a dark viewing environment, so adjustment in accordance with the viewing environment is difficult by backlight control alone.

Further, the dynamic range of luminance of the EOTF of HDR (PQ curve) is 0 to 10,000 nits, while the dynamic range of luminance of the EOTF of SDR (gamma curve) is 0 to 100 nits, so the dynamic range of luminance of the EOTF of HDR is 100 times greater than the EOTF of SDR. Further, while the contents themselves can be displayed on the display device using 0 through 100 nits in full in the case of SDR video, it is rare for display to be made on the display device using the dynamic range of luminance from 0 to 10,000 nits in the case of HDR video, and the possibility of displaying video having peak luminance of around 800 to 4000 nits on the display device is high. That is to say, this cannot be handled by simply performing backlight control where the peak luminance of dynamic range of luminance of the HDR video is made to match the peak luminance of the dynamic range of luminance of the EOTF of HDR, as in the case of displaying SDR video on an SDR TV.

2-2. Display Device and Display Method

Next, a display device that performs the display method according to the second embodiment will be described with reference to FIG. 16. FIG. 16 is a block diagram illustrating functional blocks of a display device according to the second embodiment. A display device 100a includes a converter 101a, the display unit 102, and a viewing environment light input unit 103, as illustrated in FIG. 16. Note that the display unit 102 has the same configuration as the display unit 102 of the display device 100 in the first embodiment, so detailed description will be omitted.

The viewing environment light input unit 103 detects the intensity of environment light in the space where the display device 100a is installed (i.e., the brightness of the viewing environment), and sends the detection results to the converter 101a. The viewing environment light input unit 103 is realized by an illuminance sensor or the like, for example.

The converter 101a performs fourth determining to determine whether or not the environment light is bright, in accordance with the intensity of the environment light detected by the viewing environment light input unit 103. In a case where the result of the fourth determining is that the environment light is bright, the converter 101a performs conversion using a seventh EOTF as the third EOTF, as the first conversion. The seventh EOTF is an EOTF where the dynamic range of luminance of the second EOTF has been reduced to match displayable luminance which is the display peak luminance of the display device. In a case where the result of the fourth determining is that the environment light is dark, the converter 101a performs conversion using an eighth EOTF as the third EOTF, as the first conversion. The eighth EOTF is an EOTF where the dynamic range of the second EOTF has been reduced to match a luminance lowered by a predetermined percentage of luminance from the peak luminance of the display device.

Specifically, in a case where the detected intensity of the environment light is equal to or lower than a predetermined threshold value, and the viewing environment is determined to be dark, the emission intensity of the backlight of the display unit 102 is not set to maximum but is set to emission intensity reduced by 20%, for example, from the maximum emission intensity of the backlight. Also, in a case where the detected intensity of the environment light exceeds the predetermined threshold value, and the viewing environment is determined to be bright, the emission intensity of the backlight of the display unit 102 is set to maximum. Note that in a case where the viewing environment is determined to be dark, the first conversion is performed matching a luminance reduced by 20% from the display peak luminance, and in a case where the viewing environment is determined to be bright, the first conversion is performed matching the display peak luminance. Accordingly, display in accordance with the brightness of the viewing environment can be easily realized even in a case of displaying HDR video, regarding which display at absolute luminance is assumed, on an HDR TV.

Other Embodiments

Note that the components of the above embodiments may be realized by dedicated hardware, or may be realized by a software program suitable for the components being executed. The components may be realized by a program executing unit such as a CPU or another processor or the like reading out and executing the software program recorded in a recording medium such as a hard disk, semiconductor memory, or the like. Software realizing the display method and so forth in the above embodiments is a program such as follows.

That is to say, the program causes a computer to execute a display method of displaying, on a display device, video of video data where luminance of video is defined by a first EOTF indicating a correlation of HDR luminance and code values. The video data includes peak luminance information indicating peak luminance of the video. The method includes: acquiring the video data; performing first conversion where the luminance of the video is converted to a luminance corresponding to a dynamic range of a third EOTF, where, with regard to a second EOTF that is part of the first EOTF and is the part of a luminance range where the peak luminance indicated by the peak luminance information included in the acquired video data is the maximum luminance, the dynamic range of luminance of the second EOTF is reduced with the maximum luminance of the second EOTF matching the displayable luminance of the display device, while maintaining the relative relationship of luminance of the second EOTF; and displaying the video on the display device using the result of the first conversion.

While a display method and display device and so forth according to one or multiple aspects of the present disclosure have been described by way of embodiments, the present disclosure is not restricted to these embodiments.

Various modifications to the embodiments and combinations of components of different embodiments which are conceivable by one skilled in the art may be encompassed by one or multiple aspects without departing from the essence of the present disclosure.

The present disclosure is useful as a display method, display device, and so forth that enables luminance conversion to be easily performed for video of video data corresponding to HDR in accordance with display peak luminance, and enables change in color between before and after conversion to be suppressed.

What is claimed is:

1. A display method of displaying, on a display device, video of video data including peak luminance information indicating peak luminance of the video, where luminance of video is defined by a first Electro-Optical Transfer Function (EOTF) indicating a correlation of High Dynamic Range (HDR) luminance and code values, the method comprising:
   acquiring the video data;
   performing first conversion where the luminance of the video is converted to a luminance corresponding to a dynamic range of a third EOTF; and
   displaying the video on the display device using the result of the first conversion,
   wherein a luminance range of second EOTF is a part of a luminance range of the first EOTF from a minimum luminance to the peak luminance of the video indicated by the peak luminance information included in the acquired video data, and
   wherein the dynamic range of third EOTF is obtained by reducing a dynamic range of the second EOTF so that a maximum luminance of the second EOTF matches a displayable luminance of the display device while maintaining a relative relationship of luminance of the second EOTF by multiplying a variable representing a luminance in the second EOTF by a value obtained by dividing the displayable luminance of the display device by the peak luminance of the video.

2. The display method according to claim 1, further comprising:
   performing first determining of whether or not the peak luminance indicated by the peak luminance information exceeds a predetermined luminance stored beforehand by the display device;
   in a case where a result of the first determining is that the peak luminance exceeds the predetermined luminance, performing second conversion including
      a third conversion of converting luminance in a luminance range in luminances of the video, from the predetermined luminance of the second EOTF to the peak luminance, to a luminance of a luminance range from (i) a first luminance corresponding to an upper limit value of a narrow range that is narrower than a full range stipulating a range of code values of a fourth EOTF that the display device stores beforehand to (ii) a second luminance corresponding to an upper limit value of the full range, and
      a fourth conversion of (i) converting a fifth EOTF to a sixth EOTF, where a luminance range of fifth EOTF is a part of the luminance range of the second EOTF from the minimum luminance to the predetermined luminance, and a dynamic range of sixth EOTF is obtained by reducing a dynamic range of the fifth EOTF so that a maximum luminance of the fifth EOTF matches the first luminance while maintaining a relative relationship of luminance of the fifth EOTF, and (ii) converting, of the luminances of the video, luminance of the dynamic range of the fifth EOTF to the dynamic range of luminance of the corresponding sixth EOTF; and displaying the video on the display device using the result of the second conversion.

3. The display method according to claim 2, wherein, in the third conversion, luminance in a luminance range from the predetermined luminance to the peak luminance of the second EOTF is converted to where a linear relationship is satisfied between a set of the first luminance and upper limit value of the narrow range and a set of the second luminance and upper limit value of the full range.

4. The display method according to claim 2, wherein, in a case where the peak luminance is found to be the predetermined luminance or lower as a result of the first determining, conversion of reducing the dynamic range of luminance of the second EOTF with the peak luminance matching the first luminance serving as the displayable luminance is performed as the first conversion.

5. The display method according to claim 2, wherein the full range is a range of integer values of code values from 0 to 1023,
and wherein the narrow range is a range of integer values of code values from 64 to 940.

6. The display method according to claim 2, wherein the video data further includes maximum frame average luminance information indicating maximum frame average luminance that is a maximum value of average luminance of each of a plurality of frames making up the video,
wherein second determining is performed of whether or not the maximum frame average luminance that the maximum frame average luminance information indicates is ½ of the peak luminance or lower, and
wherein, in a case where the maximum frame average luminance is found to be ½ of the peak luminance or lower as a result of the second determining, the second conversion is performed using a value that is double the maximum frame average luminance, as the predetermined luminance.

7. The display method according to claim 1, the display method further comprising:
performing third determining of determining whether or not change in luminance between two consecutive sectional videos out of a plurality of sectional videos making up the video is sudden, using the peak luminance information, and sectional peak luminance information indicating sectional peak luminance that is peak luminance of that sectional video, included in the acquired video data for each of the plurality of sectional video;
converting the dynamic range of luminance of at least one of the two sectional videos so that the change in luminance comes within a predetermined range, in a case where the result of the third determining is that the luminance change is sudden; and
performing the first conversion in which the EOTF in the dynamic range where the sectional peak luminance indicated by the sectional peak luminance information corresponding to this sectional video is the maximum luminance is the second EOTF, for each of the two sectional videos, in a case where the result of the third determining is that the luminance change is not sudden.

8. The display method according to claim 1, further comprising:
acquiring environment light in space where the display device is installed;
performing fourth determining of determining whether or not the acquired environment light is bright;
performing, as the first conversion in a case where the result of the fourth determining is that the environment light is bright, conversion using a seventh EOTF as the third EOTF, where a dynamic range of seventh EOTF is obtained by reducing a dynamic range of the second EOTF so that a maximum luminance of the seventh EOTF matches the display peak luminance of the display device; and
performing, as the first conversion in a case where the result of the fourth determining is that the environment light is dark, conversion using an eighth EOTF as the third EOTF, where a dynamic range of eighth EOTF is obtained by reducing a dynamic range of the second EOTF so that a maximum luminance of the eight EOTF matches a luminance lowered by a predetermined percentage from the display peak luminance.

9. The display method according to claim 1, wherein the displayable luminance is the display peak luminance of the display device.

10. A display device displaying video of video data including peak luminance information indicating peak luminance of the video, where luminance of video is defined by a first Electro-Optical Transfer Function (EOTF) indicating a correlation of High Dynamic Range (HDR) luminance and code values, the display device comprising:
a converter that acquires the video data, and performs first conversion where the luminance of the video is converted to a luminance corresponding to a dynamic range of a third EOTF; and
a display unit displaying the video using the result of the first conversion at the converter,
wherein a luminance range of second EOTF is a part of a luminance range of the first EOTF from a minimum luminance to the peak luminance of the video indicated by the peak luminance information included in the acquired video data, and
wherein the dynamic range of third EOTF is obtained by reducing a dynamic range of the second EOTF so that a maximum luminance of the second EOTF matches a displayable luminance of the display device while maintaining a relative relationship of luminance of the second EOTF by multiplying a variable representing a luminance in the second EOTF by a value obtained by dividing the displayable luminance of the display device by the peak luminance of the video.

* * * * *